United States Patent [19] [11] 4,265,266
Kierbow et al. [45] May 5, 1981

[54] CONTROLLED ADDITIVE METERING SYSTEM

[75] Inventors: Gerald C. Kierbow; Harvard L. Tomlinson; Herbert J. Horinek; Stephen F. Crain, all of Duncan, Okla.

[73] Assignee: Halliburton Company, Duncan, Okla.

[21] Appl. No.: 114,629

[22] Filed: Jan. 23, 1980

[51] Int. Cl.³ .......................................... G05D 11/035
[52] U.S. Cl. ................................. 137/101.19; 137/268; 222/57; 366/152
[58] Field of Search ................ 137/3, 100, 101.19, 137/101.21, 101.31, 268; 222/57; 366/20, 21, 152

[56] References Cited

U.S. PATENT DOCUMENTS

| 2,024,478 | 12/1935 | Short | 137/101.19 |
|---|---|---|---|
| 2,873,036 | 2/1959 | Noble | 366/20 X |
| 3,027,099 | 3/1962 | Ludwig | 222/57 X |
| 3,041,049 | 6/1962 | Tarakawa | 366/152 |
| 3,181,482 | 5/1965 | Heth et al. | 222/57 X |
| 3,219,046 | 11/1965 | Waugh | 137/101.19 X |
| 3,245,584 | 4/1966 | Linville | 222/57 |
| 3,822,809 | 7/1974 | Foucalt | 222/71 |
| 4,111,272 | 9/1978 | Ricciardi et al. | 177/50 |
| 4,111,335 | 9/1978 | Arya et al. | 222/57 |
| 4,111,336 | 9/1978 | Ward et al. | 222/58 |

FOREIGN PATENT DOCUMENTS 637629 3/1962 Canada .............................. 137/101.19

*Primary Examiner*—Robert G. Nilson
*Attorney, Agent, or Firm*—John H. Tregoning; Joseph A. Walkowski; Lucian Wayne Beavers

[57] ABSTRACT

A transportable frame includes a plurality of liquid material storage tanks and dry material storage bins mounted thereon. There are smaller liquid material storage tanks and larger liquid material storage tanks. The metering system for the larger liquid material storage tanks has a flow rate range varying from a low end to a high end. The metering system for the smaller liquid material storage tanks has a second flow rate range varying from a low end to a high end. The low end of the second range is lower than the low end of the first range, and the high end of the second range is between the low and high ends of the first range. There are also larger and smaller dry material storage bins with similarly sized metering systems for the dry material storage bins. The dry material storage bins are partially supported from the transportable frame by load cells which are mounted on extendable hydraulic cylinders. The system also includes apparatus for controlling the storage and metering of the additives within the tanks and bins. This apparatus includes an element which determines how much additive is being discharged from an additive storage tank and an element for sensing how much of a primary substance is being discharged from a primary substance container. Based on the operation of these two elements, a third element controls the amount of additive discharged. This third element includes a microprocessor which controls the metering based on inputs from load cells, flowmeters, and manual data entry members of which the additive determining and primary substance sensing elements and the control element are comprised.

55 Claims, 29 Drawing Figures

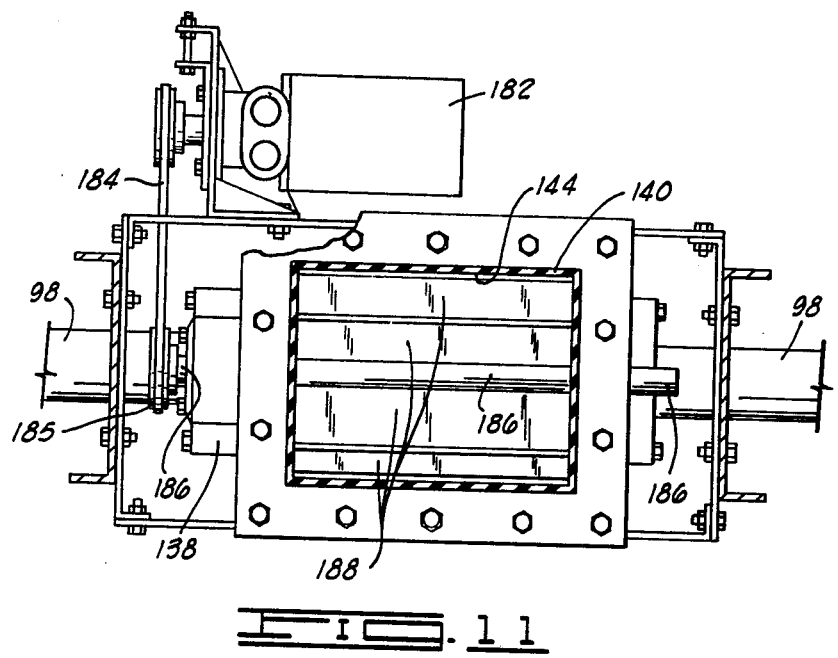
FIG. 11
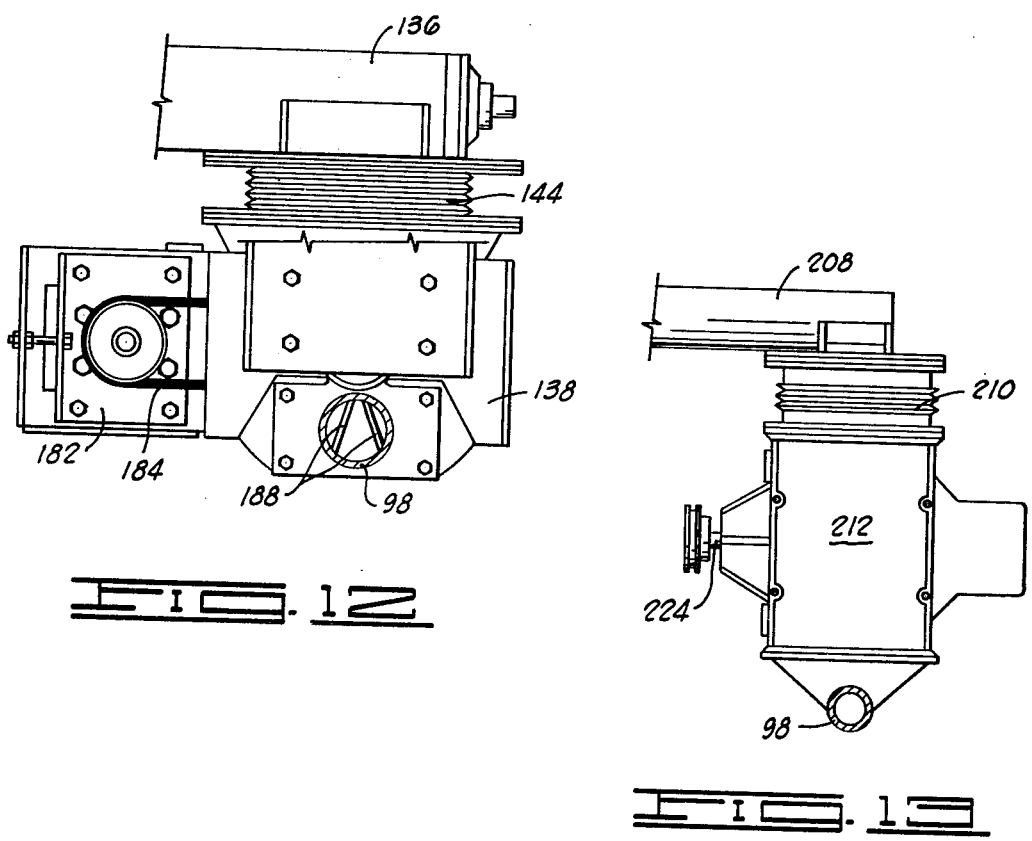
FIG. 12
FIG. 13

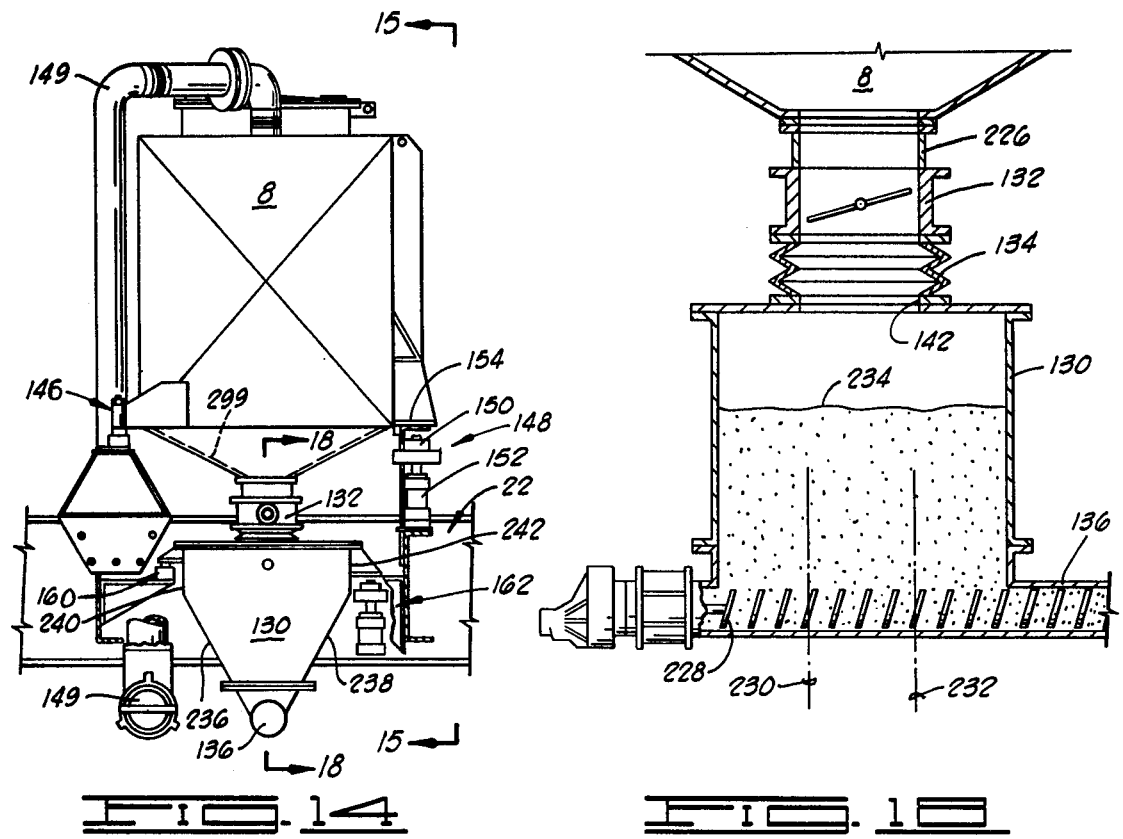
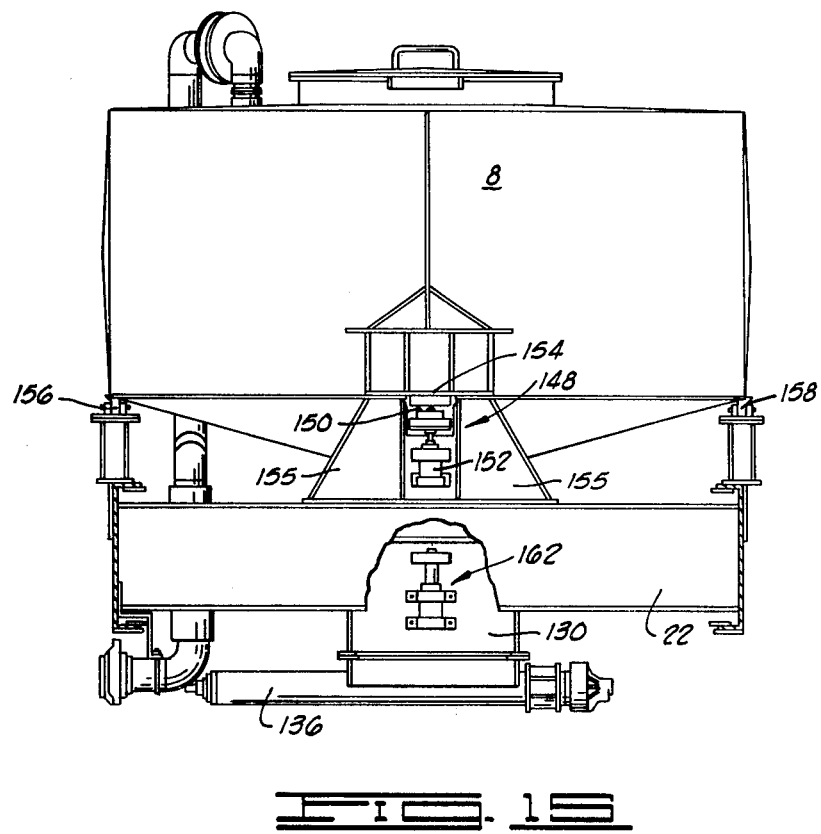

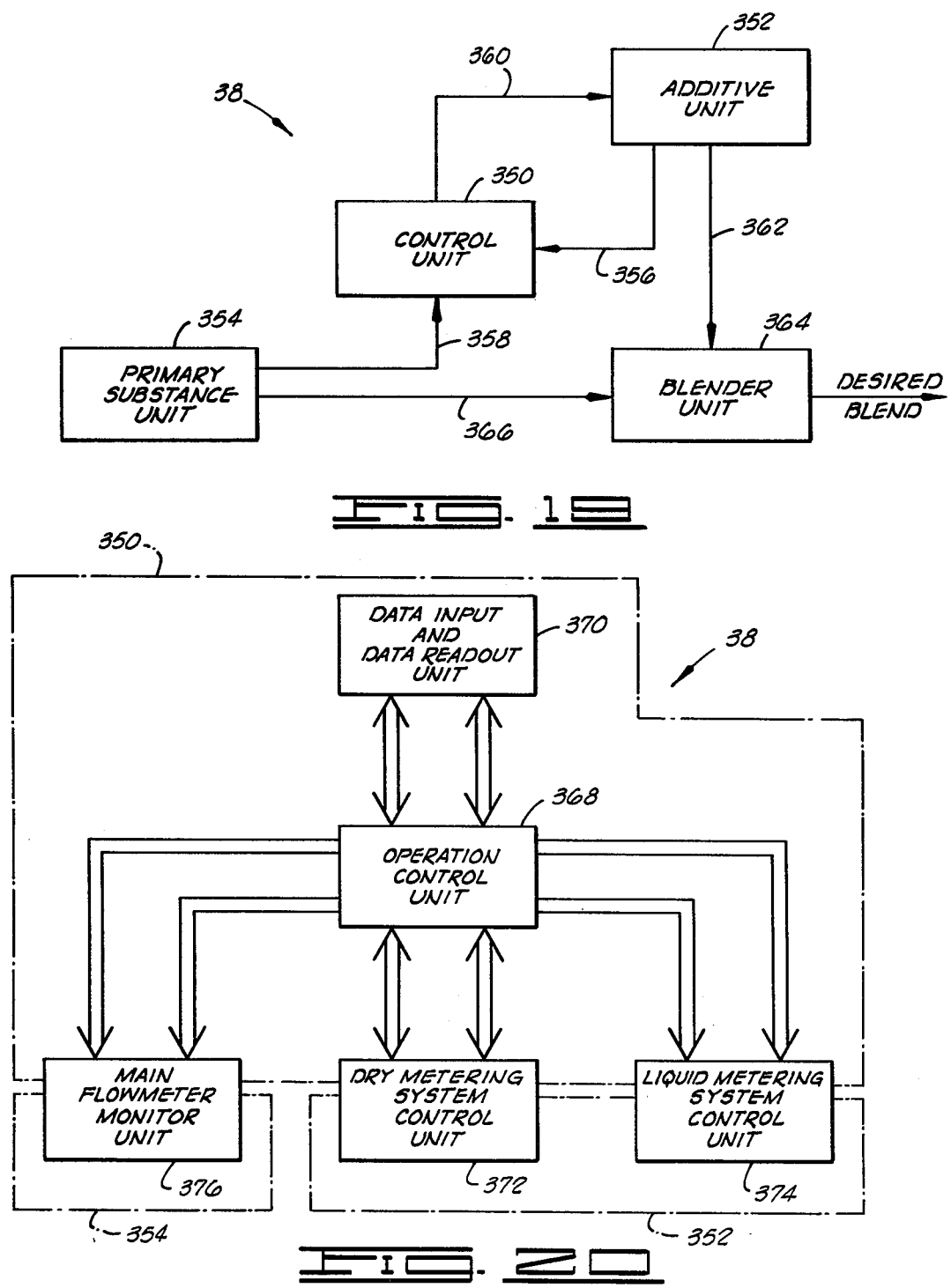

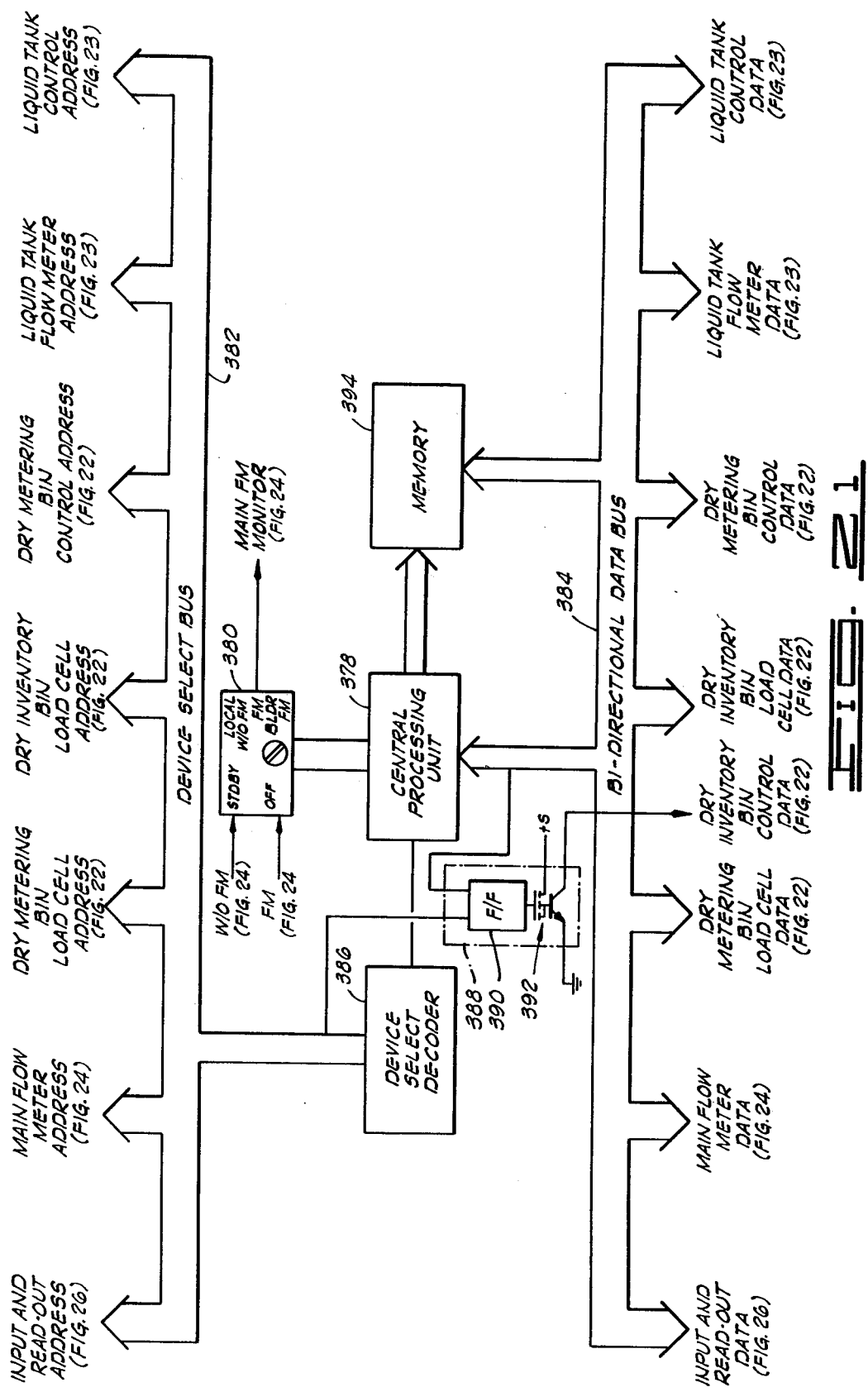

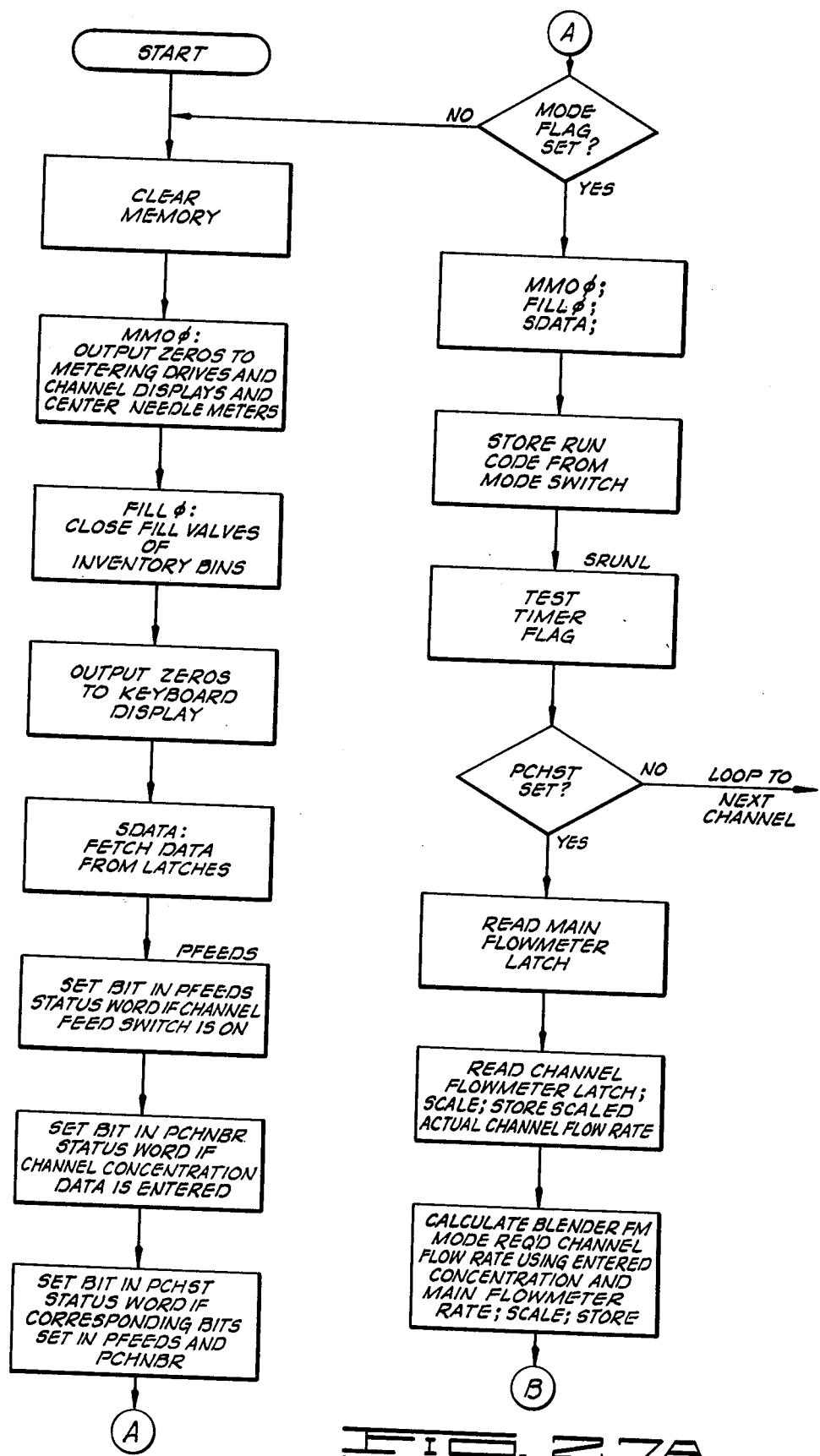

CONTROLLED ADDITIVE METERING SYSTEM

The present invention relates generally to systems for the storage and metering of material, and more particularly, but not by way of limitation, to such systems adapted for use in metering additives to be mixed with a fluid for pumping down an oil well.

During oil field drilling and production operations, it is often necessary to pump large volumes of fluid materials down the oil well for performing treating or other operations on the well. One example is a fracturing operation where large volumes of gell are pumped under very high pressures down into the oil well and into the producing formation to fracture the formation. Another example of such operations includes cementing operations where large volumes of cement are pumped down the oil well and into the annulus between the casing and borehole for permanently sealing the annulus.

During such operations, where large volumes of fluids are pumped down into the oil well, it is commonly necessary to mix numerous additives or other materials with the primary fluid prior to pumping the same down into the oil well. This provides a need for storing numerous additive materials, both dry and liquid, and for accurately metering said materials at widely varying flow rates to a point where the additive materials are mixed with the primary fluid. The concentrations of the additives relative to the primary fluid volume also vary widely.

To achieve the accurate metering so that the proper blend of additive and primary material is obtained, the amount of the additive discharged from the additive storage container and the amount of the primary substance, to which the additive is to be mixed (or the amount of the total mixture thereof), discharged from its storage container must be known. Therefore, there is the further need for providing a controlled metering system which monitors both of these discharges to control the amount of additive blended with the primary substance.

Furthermore, it is often necessary in blending materials to perform the blending in a field environment for extended periods. In the oil industry it is necessary at times to prepare mixtures of substances, such as the previously mentioned fracturing and cementing fluids, and to pump them downhole for extended periods of time. For example, blended fracturing mixtures are, at times, needed for several hours. This requires tons of chemicals to be continually blended. It is apparent that such a task cannot be performed accurately by manual labor alone. Therefore, there is also the need for the system to continuously and automatically control the metering of the additives.

The prior art methods which have typically been used for adding these large volumes of additive materials to the primary fluid to be pumped down an oil well have typically been rather crude.

For example, for dry materials, those materials are typically stored in large sacks which are stacked on a flat bed truck. The dry material is transferred from the sacks to the blender tub where it is mixed with the primary fluid by manually cutting the sacks and dumping the contents thereof into a hopper which feeds into a volume controlled vane feeder which discharges into the blender. The rate at which the material is discharged is controlled by controlling the speed of the vane feeder.

The typical manner in which liquid materials have been stored in prior art systems is to store the liquid materials in barrels or cans. Then a pump is placed in an opening of the barrel or can to pump the liquid therefrom into the mixing tub of the blender. The liquid materials are sometimes initially dumped in a holding tank from which they are pumped into the mixing tub of the blender.

The prior art does include numerous automatically controlled metering systems for dry materials such as are shown in U.S. Pat. No. 4,111,336 to Ward, et al; U.S. Pat. No. 4,111,335 to Arya, et al; and U.S. Pat. No. 4,111,272 to Ricciardi, et al. None of these systems, however, appears to disclose a system similar to that of the present invention which provides the ability to simultaneously store and meter a great many both dry and liquid additives for use in oil well treatment operations and to provide control thereto by responding to the discharge rates of the additive and the primary substance, or fluid.

The metering bins of the present invention, which are utilized for metering dry materials, are preferably a type of dry material metering bin which is generally referred to as a mass flow bin. Of relevance to the design of mass flow bins is *Bulletin of the University of Utah*, Volume 53, No. 26, Bulletin No. 123 (Nov. 1964) entitled "Storage and Flow of Solids", by Andrew W. Jenike. That reference discloses numerous general concepts about the design of such mass flow bins, but does not specifically disclose the applicability of those concepts to the situation encountered in storing large volumes of dry materials and metering the same at very accurate rates for use in treatment of oil wells.

The present invention provides a trailer-mounted portable materials storage and metering system having the ability to transport, store, meter and convey a plurality of liquid and dry additives for mixing with a primary fluid to be pumped down into an oil well. The system has the ability to provide the desirable concentrations and flow rates of typical materials used in a very large gell fracturing operation including on the order of 50,000 gallons of primary fluid, with bulk replenishment of the additives to the storage system during the job. This ability is provided by a control means which is responsive to both the discharge of the additive and the discharge of the primary substance to which the additive is to be added (or the discharge of the resultant blended substance, from which the discharge of the primary substance can be determined.)

Typical categories of additives to be utilized in gell fracturing operations include gelling agents, pH control additives, complexing agents, friction reducing agents, fluid loss agents, gell breaking agents, biocide agents, and non-emulsifying agents. All of these agents may be provided in either dry or liquid form.

Metering rates range up to 160 pounds per minute for dry materials, and up to 60 gallons per minute for liquid materials, at primary fluid delivery rates on the order of 50 barrels per minute. Concentrations of the materials in the primary liquid may range up to 80 pounds per 1,000 gallons for dry materials and up to 30 gallons per 1,000 gallons for liquid materials.

The metering system includes a plurality of dry material storage bins and a plurality of liquid material storage tanks. The liquid materials storage tanks include both larger and smaller tanks. Similarly, the dry material storage bins include both larger and smaller bins.

Each of the dry material storage bins and liquid material storage tanks includes an individual metering means for transferring materials from the respective storage means at a controlled flow rate within a range of flow rates.

The range of flow rates for the metering means for the larger dry material storage bin is a first range having a low end and a high end. The metering means for the smaller dry material storage bin has a second range of flow rates which also has a high end and a low end. The low end of the second range is lower than the low end of the first range, and the high end of the second range is between the low and high ends of the first range.

In this manner, the ranges of flow rates available from the larger and smaller dry material storage bins overlap so that a continuous range of dry material flow rates is available ranging from the low end of the range of the metering means of the small bins to the high end of the range of the metering means of the large bins.

The metering means for the smaller and larger liquid storage tanks are similarly constructed so as to have their ranges overlap providing a similar continuous range of controllable flow rates for liquid additives.

The metering means are controlled by control station means which includes means for determining the amount of additive being discharged from an additive container, means for sensing the amount of primary substance being discharged from a primary substance container, and means, responsive to both the additive substance determining means and the primary substance sensing means, for controlling the amount of additive being discharged from the additive container.

Several other improvements provided by the present invention include the manner of mounting the dry material storage bins and sensing the mass of material contained therein and transferred therefrom. Also provided is a very efficient and compact arrangement of these components on the transportable trailer frame.

Numerous features and advantages of the present invention will be readily apparent to those skilled in the art upon a reading of the following disclosure when taken in conjunction with the accompanying drawings.

FIG. 11 is a sectional view taken along line 11—11 of FIG. 8, showing a horizontal section through the flexible bellows of the metering system of one of the larger material storage bins.

FIG. 12 is a sectional view taken along line 12—12 of FIG. 8 showing a front elevation view of the dry material metering means for one of the larger dry material storage bins.

FIG. 13 is a view along line 13—13 of FIG. 9 showing a left side elevation view of the dry material metering means for one of the smaller dry material storage bins.

FIG. 14 is a left side elevation view of a single one of the larger dry material storage bins, particularly illustrating the manner in which the storage bin is mounted upon the trailer frame.

FIG. 15 is a rear elevation view of the larger dry material storage bin of FIG. 14, taken about line 15—15.

FIG. 18 is a schematic section view taken along line 18—18 of FIG. 14 showing a vertical cross section through the metering bin for the metering system of a larger dry material storage bin.

FIG. 19 is a general functional block diagram of the control station of the present station.

FIG. 20 is a functional block diagram of a preferred embodiment of the control station of the present invention.

FIG. 21 is a functional block diagram of the operation control unit of the FIG. 21 embodiment.

FIGS. 27A–27C are a flow chart of the computer program of the present invention.

Figure 1:
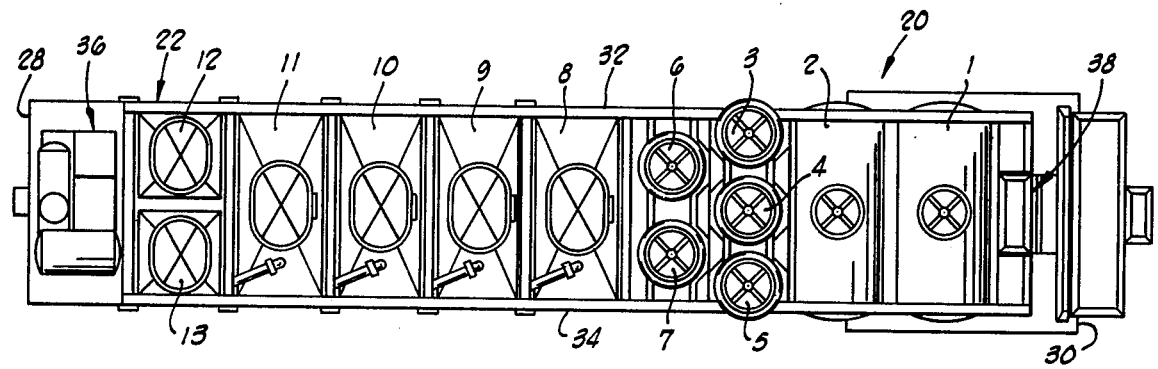
FIG. 1 is a plan view of the trailer mounted material storage and metering system of the present invention.
Figure 2:
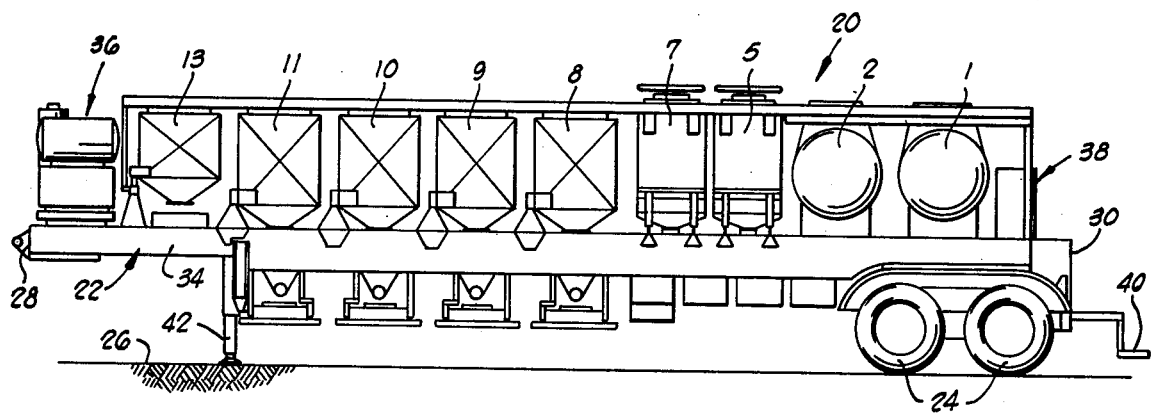
FIG. 2 is a left side elevation view of the system of FIG. 1.
Figure 3:
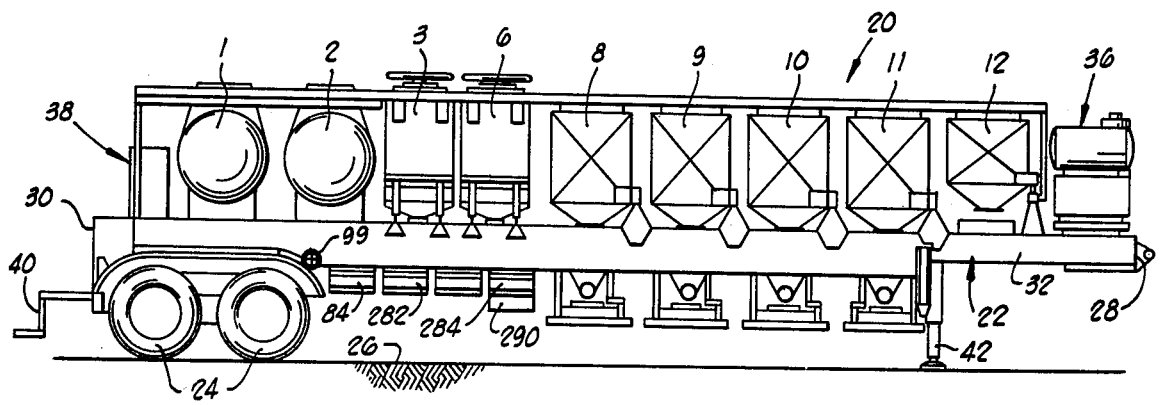
FIG. 3 is a right side elevation view of the system of FIG. 1.

Referring now to the drawings, and particularly to FIGS. 1-3, the material metering and storage system of the present invention is shown and generally designated by the numeral 20.

The system 20 includes a transportable trailer frame 22, having a plurality of wheels or other ground engaging means 24, for allowing the frame 22 to traverse a ground surface 26 so that the present invention is portable.

Mounted upon the frame 22 are thirteen additive material storage means indicated by the numerals 1 through 13.

The frame 22 is a rectangular frame having first and second opposed shorter sides 28 and 30, and having third and fourth opposed longer sides 32 and 34.

Material storage means 1 and 2 are larger liquid material storage tanks having a capacity of 500 gallons each. Larger liquid material storage tanks 1 and 2 are each horizontally oriented cylindrical tanks having a cylindrical axis thereof oriented substantially parallel to first and second sides 28 and 30 of frame 22 and having a cylindrical length approximately equal to the width of frame 22.

Material storage means 3, 4, 5, 6 and 7 are smaller liquid storage tanks having a capacity of 150 gallons. Smaller liquid storage tanks 3 through 7 are vertically oriented cylindrical tanks being arranged on frame 22 in two rows across the width of frame 22.

Storage means 8, 9, 10 and 11 are larger dry material storage bins having a capacity of seventy-five cubic feet each, which translates to about 2,000 pounds of typical dry material. Each of the larger dry material storage bins 8 through 11 have a substantially rectangular horizontal cross section with a length of said cross section being oriented substantially parallel to the first and second sides 28 and 30 of frame 22, and with a width of said cross section being oriented substantially parallel to third and fourth sides 32 and 34 of frame 22. The horizontal cross sectional length of larger dry material storage bins 8 through 11 is approximately equal to the width of frame 22.

Storage means 12 and 13 are smaller dry material storage bins having a capacity of twenty-five cubic feet. Smaller dry material storage bins 12 and 13 are arranged in a row across the width of frame 22.

The liquid material storage means 1 through 7 are all oriented on a rearward portion of frame 22. The dry material storage means 8 through 13 are all located on a forward portion of frame 22.

It will be understood with regard to the term "dry material", that such dry materials will generally have at least some moisture content. The term "dry material" as used herein, is used interchangeably with the term "solid phase materials" so as to refer to materials that are not liquid or gaseous materials. These dry or solid phase materials are generally provided in a granulated or powdered form.

Located near the forward end 28 of trailer 22 is a self-contained power system 36 for providing power to the various hydraulic and electrically powered components of the storage and metering system 20.

Located at the rearward end 30 of trailer frame 22 is a control station means 38 for controlling the storage and metering system 20.

A folding step 40 at the rearward end of trailer 22 provides an access means so that an operator may approach and operate the control station 38.

Near the front end of trailer 22 is a support jack 42 for supporting the trailer when it is not being transported. When it is desired to transport the trailer 22, the front end 28 thereof is attached to a conventional tractor.

Located above the various storage means of the system 20 is a walkway and work platform which is not shown in these illustrations, so that the various other components may be more clearly illustrated.

Figure 4:
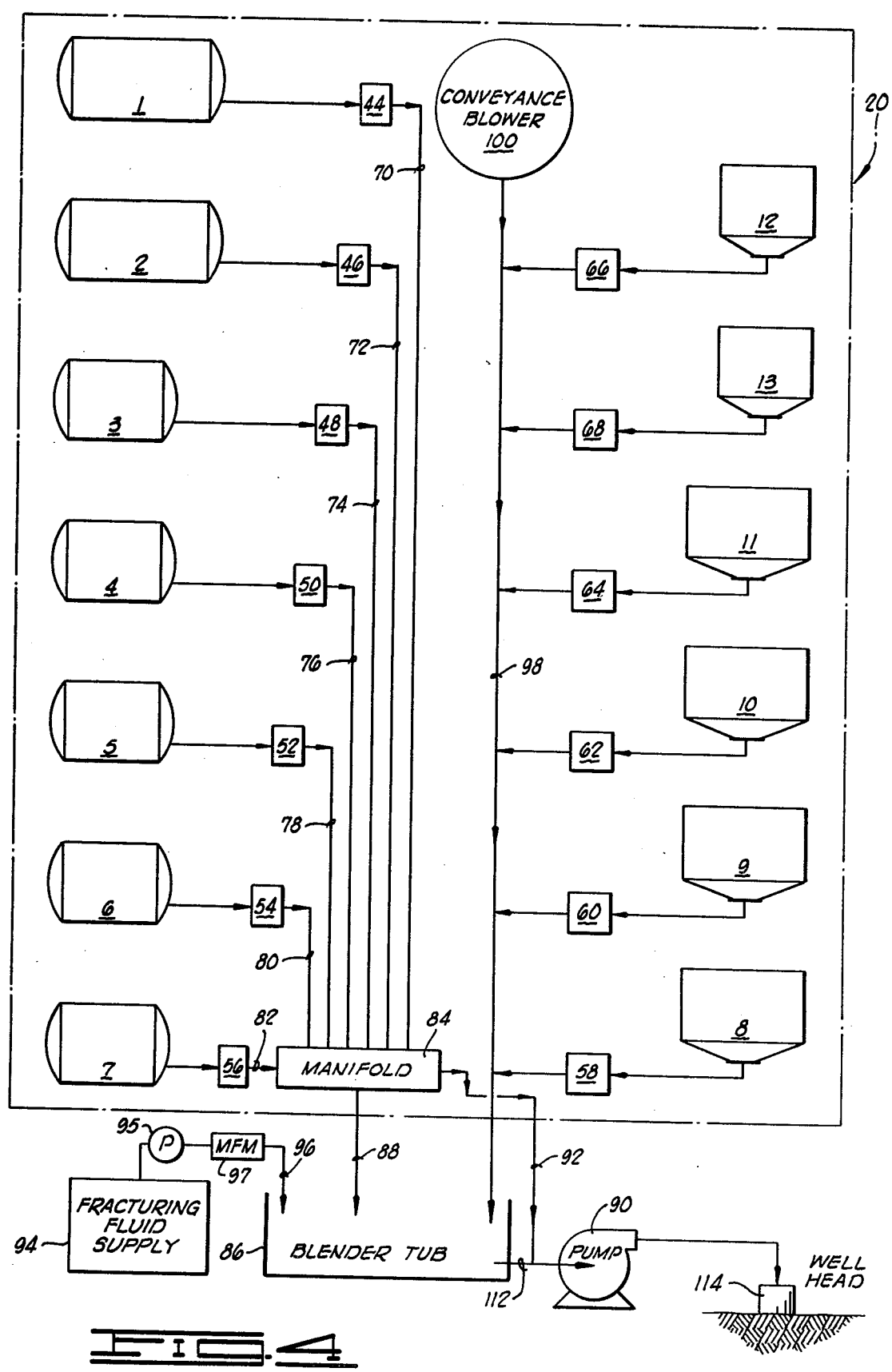
FIG. 4 is a schematic illustration of the system of FIG. 1 illustrating the various storage means and discharge systems as connected to the other components for mixing the additives with the primary fluid which is pumped down into the oil well.

Referring now to FIG. 4, the storage and metering system 20 is there schematically illustrated to show the manner in which the material discharge conduits from the various storage means 1 through 13 are interconnected together and with the other equipment necessary for mixing the materials with a primary fluid for pumping into an oil well.

Connected to liquid storage tanks 1, 2, 3, 4, 5, 6 and 7 are liquid material metering means 44, 46, 48, 50, 52, 54 and 56, respectively, for transferring liquid materials from their respective liquid storage tanks. Connected to dry material storage bins 8, 9, 10, 11, 12 and 13 are dry material metering means 58, 60, 62, 64, 66 and 68, respectively, for metering materials from their respective dry material storage bins.

The metering systems 44 through 56 of liquid storage tanks 1 through 7 are connected by liquid discharge conduits 70, 72, 74, 76, 78, 80 and 82, respectively, to a series of valving generally represented by manifold 84.

By appropriate adjustment of manifolding 84, the discharge from each of the discharge conduits 70 through 82 may be independently directed either directly into a blender tub 86 as represented by conduit 88 or may be bypassed around blender tub 86 and added directly at the suction of pump 90 as indicated by conduit 92.

In the blender tub 86 the various materials from storage and metering system 20 are mixed with a primary fluid, such as water, provided by fracturing fluid supply 94 by means of conduit 96. Located in the conduit 96 is a pump 95 and a main flowmeter 97 (MFM) for converting the discharge rate of the primary fluid into a proportional electrical signal. It is noted that the main flowmeter 97 could be positioned elsewhere, such as the outlet of the pump 90. In such a position, the generated electrical signal would be proportional to the flow rate of the combined additive/primary substance mixture.

It is sometimes desirable to direct some of the liquid additives directly to the suction of pump 90 through conduit 92 in order to prevent premature mixing of certain incompatible additives which have a reaction, one to the other.

The discharge from each of the dry material metering means 58 through 68 is connected to a single dry material discharge conduit 98. A conveyance blower 100 supplies a conveying fluid, preferably air, to dry material discharge conduit 98 and said conveying fluid carries the dry material along therewith through discharge conduit 98 to blender tub 86.

The dry material discharge line 98 includes an integral portion mounted on trailer frame 22 which includes an end 99, as shown in FIG. 3. The remainder of conduit 98 between end 99 and blender tub 86 is comprised of any suitable conduit connected therebetween.

After the various liquid and dry additives are mixed with the primary fluid in the blender tub 86, the entire mixture is taken from blender tub 86 by a suction line 112 of pump 90 and is discharged from pump 90 at a high pressure into well head 114 of a well.

The liquid material metering systems 44 and 46 for transferring liquid materials from the larger liquid storage tanks 1 and 2 are constructed to have generally higher flow rate capacities than are the liquid material metering systems 48 through 56 of smaller liquid storage tanks 3 through 7. The range of flow rates which may be provided by the liquid metering systems 44 and 46 for the larger storage tanks 1 and 2, overlaps with the somewhat lower range of flow rates which may be provided by metering systems 48 through 56 of smaller liquid storage tanks 3 through 7.

More specifically, liquid metering systems 44 and 46 have an operating range varying from a low end of 5.0 gallons per minute to a high end of 60 gallons per minute. Metering systems 48 through 56 have an operating range varying from a low end of 0.70 to 12 gallons per minute. Of course, each of the metering systems operates best at some intermediate point within its specified operating range.

In this manner, for a given liquid material, any flow rate can be provided within an overall range from 0.70 to 60 gallons per minute by placing the specific liquid material in the appropriate storage tank. Similarly, due to the fact that these materials are added to a flowing primary fluid stream, the liquid metering systems 44 and 46 with the high potential flow rates may provide higher concentrations of additives to the primary liquid stream than can the lower capacity metering systems 48 through 56.

Metering systems 44 and 46 can provide liquid concentrations in the range from 0.1 to 30 gallons of additive per 1,000 gallons of primary fluid being injected into the oil well 114. The smaller metering systems 48 through 56 can provide a liquid concentration within a range of 0.02 to 8 gallons of additive per 1,000 gallons of primary fluid.

Similarly, the dry material metering systems 58 through 64 of larger dry material storage bins 8 through 11 have a larger capacity and a generally overall higher operating capacity range than the dry material metering systems 66 and 68 for smaller dry material storage bins 12 and 13.

Metering systems 58 through 64 can provide dry materials at a flow rate within a range varying from 10 to 160 pounds per minute. These additives may be provided at dry concentrations from 10 to 80 pounds of additive per 1,000 gallons of primary fluid.

Similarly, metering systems 66 and 68 for smaller dry material storage bins 12 and 13 can provide dry material flow rate within a range from 4 to 30 pounds per minute at concentrations ranging from 1 to 30 pounds of additive per 1,000 gallons of primary fluid.

Figure 5:
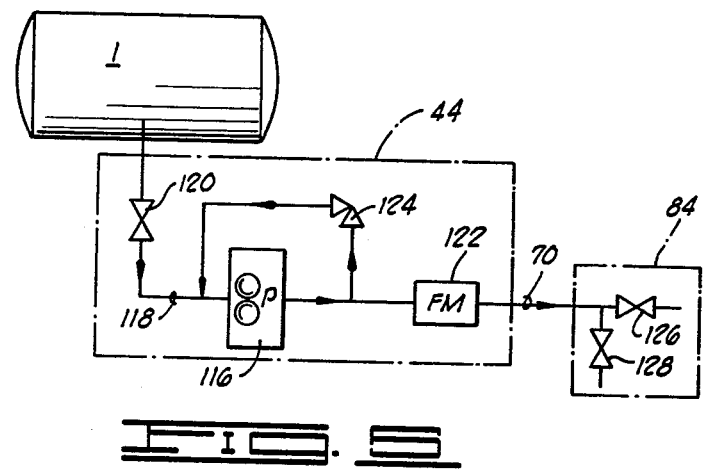
FIG. 5 is a schematic representation of a typical liquid tank discharge system.

Referring now to FIG. 5, a typical schematic illustration is shown at one of the liquid storage tanks with its respective liquid metering system as connected to a portion of the manifold 84. For convenience of illustration, FIG. 5 will be described with respect to large liquid storage tank 1 and its associated metering equipment.

The liquid material metering system 44 includes a hydraulically powered positive displacement type liquid pump 116. Pump 116 is connected to storage tank 1 by a suction line 118 in which is disposed a safety shut-off valve 120. The discharge of pump 116 is connected to a liquid material discharge line 70. Disposed in discharge line 70 is a flow meter 122 which is preferably a turbine type flow meter.

A safety relief valve 124 is provided for allowing discharge line 70 to be bypassed back to suction line 118 in the event discharge line 70 should be shut in or otherwise allowed to over pressure, thereby preventing the equipment from being damaged by excess pressure generated by positive displacement pump 116.

Connected to discharge line 70 are two valves 126 and 128 which form a portion of manifold 84. Each of the discharge lines 70 through 82 has a pair of valves similar to valves 126 and 128 attached thereto, and they are arranged physically adjacent each other to form the manifold 84 which is attached to trailer frame 22 in the location shown schematically in FIG. 3.

By means of the manifold 84 each one of the discharge lines 70 through 82 may be individually connected to the blender tub 86 or to the suction line 112 of pump 90 as seen in FIG. 4 by a suitable conduit. Similarly, any combination of the discharge conduits 70 through 82 may be connected together by a series of short bypass lines connecting downward directing valves such as valves 128 together so as to provide a convenient means for connecting the discharge from the various liquid tanks. Then, the combined discharge from the desired liquid tanks may be directed by a single conduit 88 to the blender tub 86 or by a single conduit 92 to the suction line 112.

Figure 6:
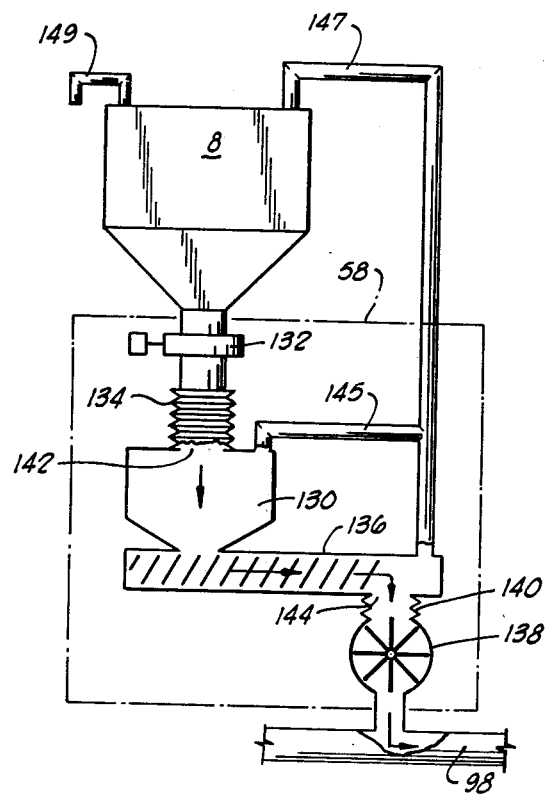
FIG. 6 is a schematic representation of a typical dry material discharge system.

Referring now to FIG. 6, a schematic illustration is thereshown of one of the dry material storage bins with its associated dry material metering means as connected to the dry material discharge conduit 98. For purposes of convenient illustration, the typical system shown in FIG. 6 will be described with relation to the specific components of larger dry material storage bin 8.

The dry material metering system 58 comprises a two bin system with the first bin being the storage bin 8 which may also be referred to as an inventory bin 8, and the second bin being a metering bin 130 which is smaller than the inventory bin 8. Each of the storage bin and metering bin may generally be referred to as a container means. The metering bin 130 has a capacity of 6 cubic feet. The analogous metering bin for one of the smaller storage bins has a capacity of 2 cubic feet.

The metering bin 130 provides a means for receiving dry material from the storage bin 8. Appropriate sensing devices, which are described in more detail below and which form a portion of the contral station means 38 although they are physically located within the described metering means, sensing the weights of storage bin 8 and metering bin 130, so that when the amount of material in metering bin 130 reaches a predetermined low level, the sensing means sends a signal which causes the control station means to open a hydraulically operated butterfly valve 132 to dump more material from storage bin 8 into metering bin 130. When the metering bin 130 is full, as determined by the sensing means sending a signal which indicates a predetermined level has been reached, the control station means 38 closes the butterfly valve 132. Metering bin 130 is connected to storage bin 8 by a first flexible connecting means 134, which is preferably constructed as a flexible bellows 134.

A screw conveyor means 136, which may also be referred to as a vane feeder, is disposed in the bottom of metering bin 130 for discharging dry material from metering bin 130 at a controlled rate within the range of flow rates described above for dry material metering system 58.

The screw conveyor 136 is connected to dry material discharge conduit 98 through an air lock means 138 which provides a means for allowing passage of material therethrough while preventing an internal pressure within discharge conduit 98 from being communicated to screw conveyor 136.

The screw conveyor means 136 is connected to air lock 138 by a second flexible connecting means 140 which is preferably a flexible bellows 140. Flexible bellows 140 may also be said to connect screw conveyor 136 to discharge line 98.

The air lock means 138 as used with larger dry material storage bins 8 through 11 is a blow through type air lock which is described in more detail below with reference to the detailed illustrations of the air locks. The air locks used with smaller dry material storage bins 12 and 13 and their respective metering systems 66 and 68 are preferably drop through type air locks which are also described in more detail below.

An area of an upward facing opening 142 in metering bin 130 communicating with storage bin 8 through valve 132 is substantially equal to an area of a downward facing opening 144 in screw conveyor means 136 communicated with second flexible bellows 140. Openings 142 and 144 are more clearly shown in FIGS. 18 and 11, respectively. A vent means 145 communicates a discharge end of conveyor means 136 with an upper portion of metering bin means 130 so that internal pressures within metering bin 130 and first conveyor means 136 as communicated to openings 142 and 144 are substantially equalized. In this manner, the forces acting on metering bin means 130 and screw conveyor means 136 due to internal pressures are balanced so that they do not affect the weight of metering bin means 130 and screw conveyor means 136 as weighed by a weight sensing means which is described below.

An extension 147 of vent line 145 communicates with storage bin 8, so that dust is contained within the system. A storage bin vent 149 is also provided.

Referring now to FIG. 14, a left side elevation view is shown of dry material storage bin 8 and metering bin 130 as attached to trailer frame 22. A bulk replenishment line 149 is visible in FIG. 14, and provides a means for replenishing the dry material in bin 8.

Storage means 8 is supported from frame 22 by a first support means 146 and a load cell support means 148.

Load cell support means 148 includes a sensing element 150 for sensing a weight supported by load cell means 148 and for generating a signal representing said weight. A hydraulic cylinder lift means 152 of load cell support means 148 is movable between a first position (not shown) wherein sensing element 150 of load cell support means 148 is held in load supporting engagement with a horizontally extending support bracket 154 of storage bin 8, and a second position, as shown, wherein sensing element 150 of load cell support means 148 is held out of load supporting engagement with support brackets 154 of storage bin 8.

The first support means 146 includes left and right supporting mounts 156 and 158, as best seen in FIG. 15. Mounts 156 and 158 of first support means 146 may be pin mounts or ball and socket mounts, but preferably are constructed so as to provide a means for providing at least one degree of freedom of movement, in kinematic terms, between storage bin 8 and frame 22. The ball and socket joint, of course, provides three degrees of freedom of movement.

This flexible mounting provided by first support means 146 is desirable because of the fact that the trailer frame 22 may be transported over rough terrain, and also because of the need for movement of the bins upon engagement therewith of the load cell support means.

First support means 146 and load cell support means 148 are symmetrically located on opposite sides of a vertical plane disposed centrally through storage bin 8 and extending perpendicularly out of the plane on which FIG. 14 is drawn. In that manner, assuming that storage bin 8 is evenly loaded, one half the weight of storage bin 8 and its contents is supported by first support means 146 and one-half of the weight of the storage bin 8 and its contents is supported by load cell support means 148.

The purpose of the hydraulic cylinder lift means 152 is to allow the load cell support means 148 to be disengaged from the storage bin 8 when the trailer frame 22 is being moved. This prevents damage to the sensing element or load cell 150. When cylinder 152 is retracted the support bracket 154 of bin 8 rests on a frame member 155 of frame 22 which may be referred to as a transportation mode support means 155.

Similarly, metering bin 130 is supported from trailer frame 22 by a first support means 160 and a load cell support means 162 having a sensing element supported therein.

Figure 16:
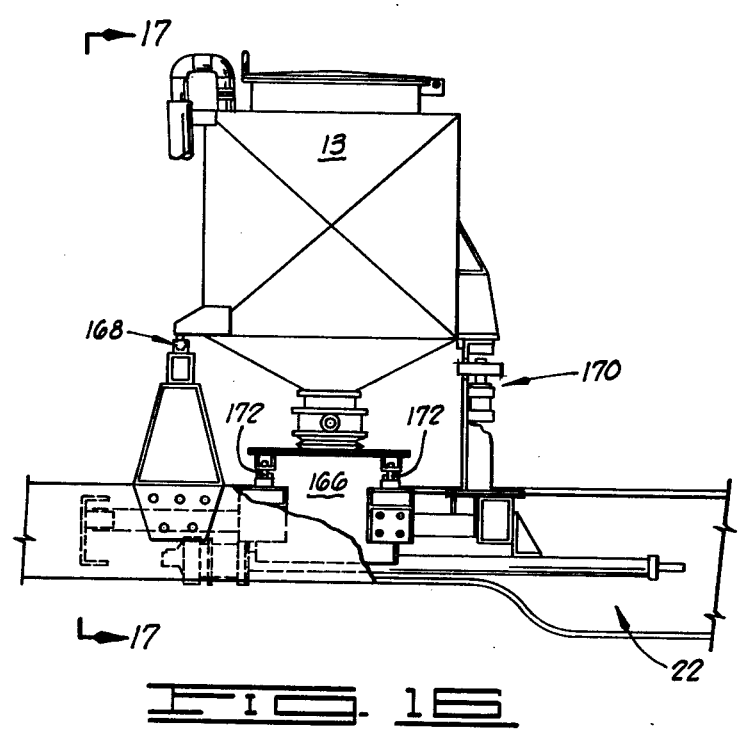
FIG. 16 is a left side elevation view of one of the smaller dry material storage bins, particularly showing the manner of mounting the storage bin upon the trailer frame.
Figure 17:
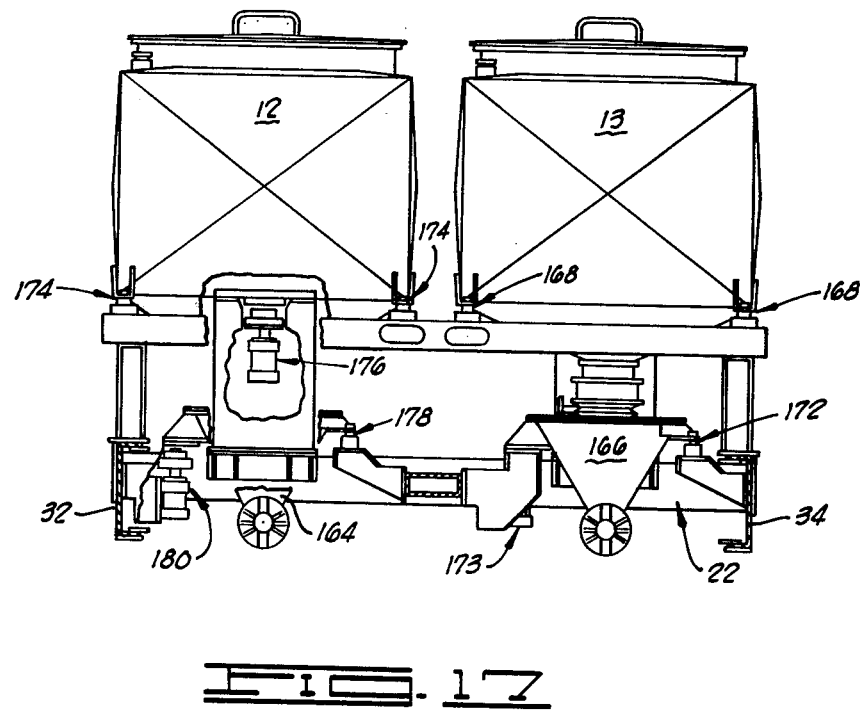
FIG. 17 is a front elevation showing the two smaller dry material storage bins of FIG. 16, taken about line 17—17.

Referring now to FIGS. 16 and 17, similar illustrations are shown of the mounting of the smaller dry material storage bins 12 and 13 and their associated dry material metering systems.

Disposed below storage bin 12 is its associated metering bin 164, and disposed below storage bin 13 is its associated metering bin 166.

Metering bin 13 is shown in the left side elevation view of FIG. 16 and it is seen to be supported from trailer frame 22 by a first support means 168 and a load cell support means 170. Metering bin 166 is supported from trailer frame 22 by first support means 172 and a load cell support means 173 (See FIG. 17).

As is seen in FIG. 17, storage bin 12 is supported from frame 22 by a first support means 174 and a load cell support means 176, which is located on the rear side of the bin and illustrated in FIG. 17 by cutting away the supporting structural members in front of load cell support means 176.

The metering bin 164 for storage bin 12 is supported from frame 22 by a first support means 178 and a load cell support means 180.

The load cell support means for the storage bins 8 through 13 preferably include electric load cells as the respective sensing elements and the load cell support means for the metering bins preferably include hydraulic load cells as the respective sensing elements.

Referring now to FIGS. 8 through 13, some details of the construction of the dry material metering systems for bins 8 through 13 are thereshown.

Figure 8:
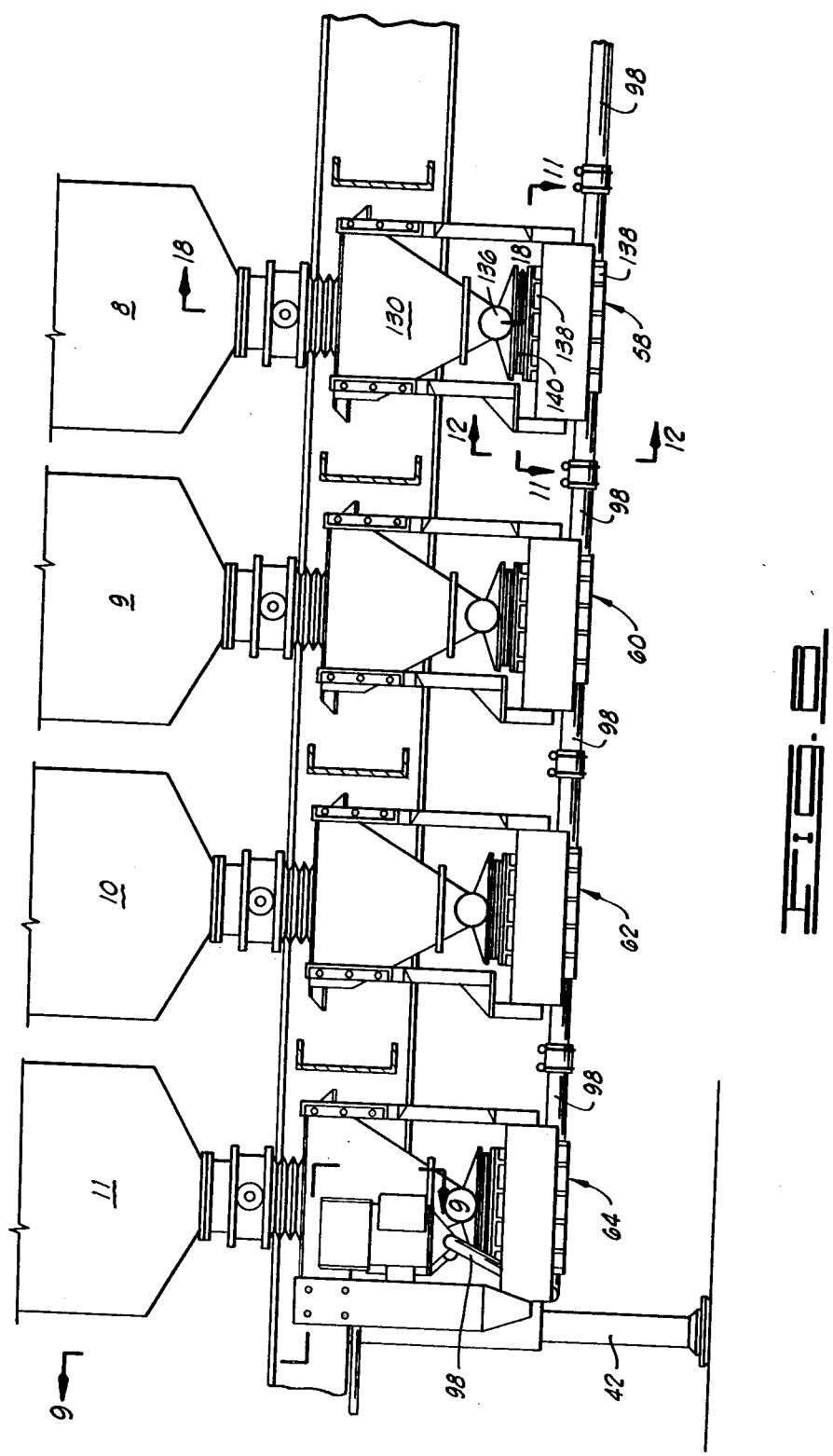
FIG. 8 is an enlarged left side elevation view of the dry material metering system for the four large dry material storage bins.

As is shown in FIG. 8, the blow through type air locks, such as air lock 138 of dry material means 58 for storage bin 8, are aligned with discharge conduit 98 so that the blow through type air locks in fact form a portion of discharge conduit 98. The blow through type air locks are therefore connected in series within dry material discharge conduit 98.

More of the details of dry material metering means 58 are shown in FIGS. 11 and 12 as taken about lines 11—11 and 12—12, respectively, of FIG. 8.

FIG. 11 is a horizontal section view through the flexible bellows 140 connected between screw conveyor 136 and blow through air lock 138. The air lock 138 is a rotating vane type air lock which functions in a manner similar to a revolving door, and which is rotated by a hydraulic air lock driving motor 182 as connected to the rotating vane by drive belt 184. Belt 184 drives a pulley 185 on air lock shaft 187. Belt 184 and pulley 185 may be replaced by a chain and sprocket. A plurality of vanes 188 extend from shaft 186.

The discharge conduit 98 is offset below the central axis of air lock shaft 186, so that the rotating vanes of air lock 138 prevent pressure within discharge conduit 98 from being communicated with screw conveyor 136. The discharge conduit 98 blows between the rotating vanes 188 as they traverse the lower portion of their rotating path. This clears the dry material from between the vanes.

Figure 9:
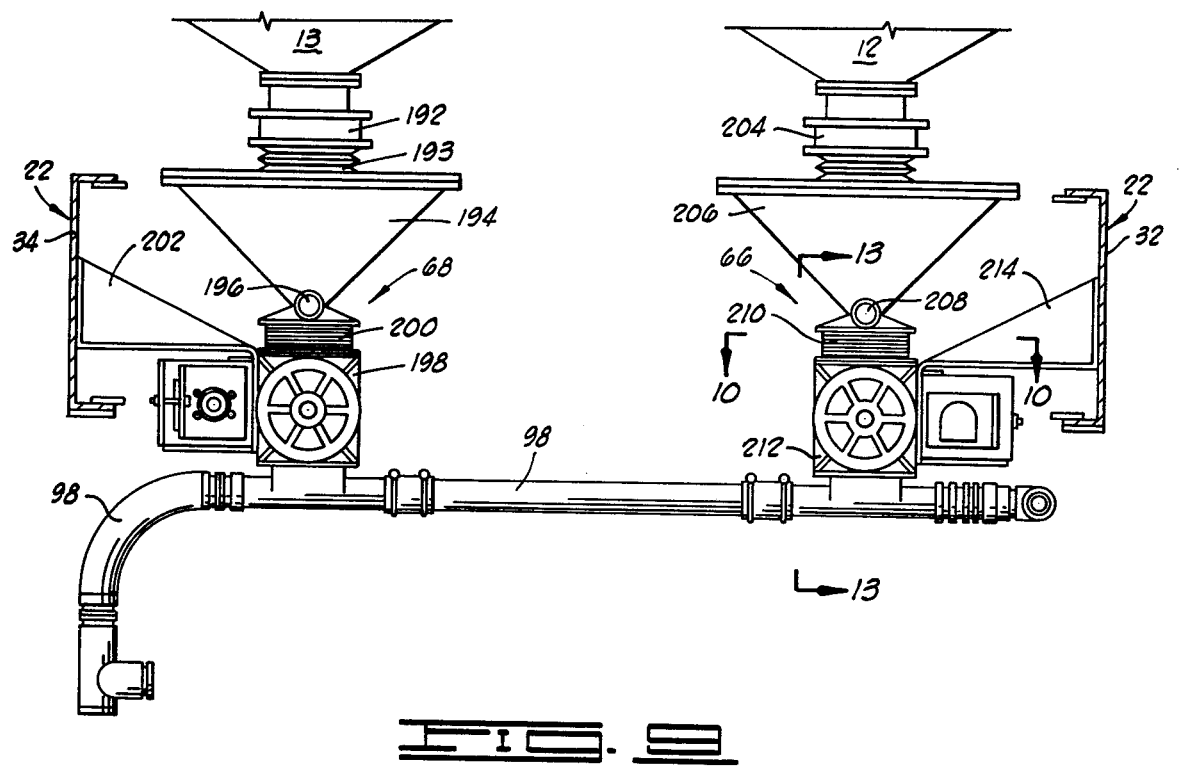
FIG. 9 is a rear elevation view of the dry material metering system for the two smaller dry material storage bins as taken along line 9—9 of FIG. 8.
Figure 10:
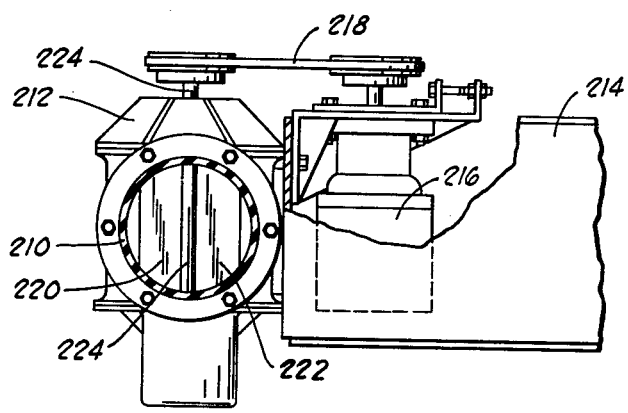
FIG. 10 is a sectional view taken along line 10—10 of FIG. 9 showing a horizontal section through the flexible bellows of the dry material discharge system for one of the small dry material bins.

Referring now to FIGS. 9, 10 and 13, various details of the dry material metering systems for smaller dry material storage bins 12 and 13 are thereshown.

FIG. 9 is a rear elevation view taken along line 9—9 of FIG. 8. The metering systems 66 and 68 for smaller dry material storage bins 12 and 13 are illustrated.

Metering system 68 for smaller dry material storage bin 13 includes a hydraulically operated butterfly valve 192 connected between storage bin 13 and a flexible bellows 193 connecting butterfly valve 192 to smaller dry material metering bin 194.

Disposed in the lower portion of metering bin 194 is a screw conveyor 196. Connecting a discharge end of screw conveyor 196 to a drop through type air lock 198 is a flexible bellows 200. The lower discharge end of drop through air lock 198 is connected to dry material discharge conduit 98.

As is shown in FIG. 9, the drop through air lock 198 is attached to trailer frame 22 by a mounting bracket 202.

Metering system 66 of smaller dry material storage bin 12 is similarly constructed, having a butterfly valve 204, metering bin 206, conveyor 208, flexible bellows 210, drop through air lock 212 and mounting bracket 214.

A horizontal sectional view is taken along line 10—10 through flexible bellows 210 of metering system 66 for smaller dry material storage bin.

Shown in FIG. 10 are the drop through type air lock 212, and its associated drive motor 216 and drive belt 218. Belt 218 and its associated pulleys may be replaced by a chain and sprockets. The drop through type air lock is similar to the blow through type air lock previously described in that it includes a plurality of radially spaced rotating vanes which convey material from the bellows 210 to the discharge conduit 98 while preventing pressure from within conduit 98 from being communicated to bellows 210.

The drop through type air lock 212, however, differs from the previously described blow through type air lock in that the drop through type air lock does not place the vanes directly in the path of the discharge conduit 98, but rather places them above discharge conduit 98 so that the dry material falls downward from between the vanes as the vanes traverse the downwardmost portion of their arc directly above discharge conduit 98.

Two vanes 220 and 222 of drop through air lock 212 can be seen in FIG. 10 extending radially outward from air lock shaft 224.

A left side elevation view of drop through air lock 212 as connected between discharge conveyor 208 and discharge conduit 98 is shown in FIG. 13. That is a view about line 13—13 of FIG. 9.

Referring now to FIG. 18, a vertical sectional view along line 18—18 of FIG. 8 is taken through metering bin 130 schematically showing its connection to the conveyor 136 and to the storage bin 8.

The flexible bellows 134 is connected to the top of metering bin 130 and the butterfly valve 132 is connected thereto. A short extension member 226 connects butterfly valve 132 to storage bin 8.

As can be seen in FIG. 18, the conveyor means 136 has a varying pitch along the length of screw 228.

The bin 130 is divided into thirds along imaginary lines 230 and 232, and at lines 230 and 232 the pitch of the screw 228 changes. The screw has its smallest pitch to the left of line 230, as seen in FIG. 18. Between lines 230 and 232, the pitch is increased so that that portion of screw 228 can carry more material than can the portion to the left of line 230. The portion of screw 228 to the right of line 232 has the greatest pitch and in turn, can carry even more material than that portion of the screw between lines 230 and 232. The pitch is increased in an amount sufficient to permit the screw 228 to carry all of the material which has entered the screw to the left of any given point on the screw, plus additional material falling into the screw from directly above, so that the material within bin 130 is evenly drawn out of the bottom of the bin 130, maintaining an approximately level upper surface 234 of the material in bin 130.

Metering bin 130 is preferably a mass flow bin. The term "mass flow" indicates that whenever the conveyor 136 is set in motion, all of the material within bin 130 flows, and there are no inactive or dead regions of flow within the bin. Mass flow bins typically are characterized by steep hopper sides and by the absence of sharp transition points along the inner surface of the bin.

One such type of mass flow bin is known as a "chisel hopper" which typically has two steep tapered sides, 236 and 238 as seen in FIG. 14 which converge along the length of the screw conveyor. Parallel vertical sides 240 and 242 are also included in metering bin 130 to increase the capacity thereof.

As can be seen in FIG. 9, the smaller metering bins 194 and 206 for smaller dry material storage bins 13 and 12, respectively, are also chisel bins in that they have the two tapered sides similar to sides 236 and 238, but those smaller bins 194 and 206 do not have the parallel vertical sides at the top thereof.

Figure 7:
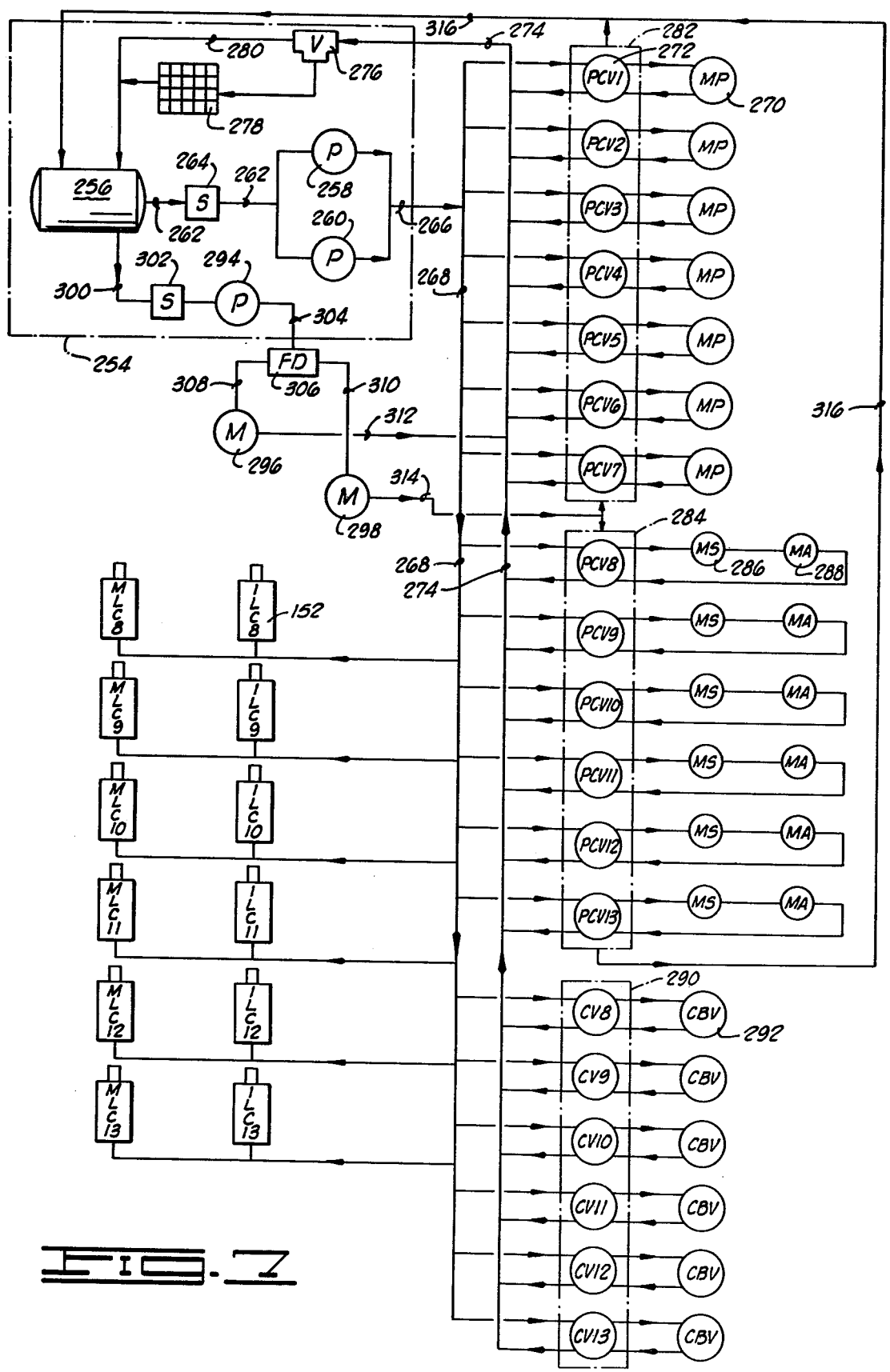
FIG. 7 is a schematic representation of the hydraulic power system which operates the various components of the system of FIG. 1.

Referring now to FIG. 7, a hydraulic schematic illustration is thereshown of the hydraulic power system connecting the various components of the system 20.

A portion of the self-contained power system 36 shown in FIGS. 1-3 is a hydraulic power supply source which is schematically illustrated in FIG. 7 and generally indicated by the numeral 254.

Hydraulic power supply 254 includes a hydraulic fluid storage sump 256. First and second main hydraulic supply pumps 258 and 260 take hydraulic fluid from source 256 through a common suction line 262. A conventional strainer 264 is disposed in such suction line 262. A common discharge line 266 from pumps 258 and 260 connects them to a main hydraulic supply conduit 268.

As previously described with relation to FIG. 5, the liquid storage tanks 1 through 7 have liquid metering systems 44 through 56, respectively, each of which includes a positive displacement pump such as pump 116 of metering system 44 for liquid storage tank 1. Each of the pumps like pump 116 is a hydraulically driven pump, and therefore includes a hydraulically powered pump motor. The pump motor for pump 116 of storage tank 1 is indicated in the upper right hand corner of FIG. 7 by the numeral 270. The flow of hydraulic power fluid to pump motor 270 is controlled by an electric over hydraulic proportional control valve 272. Proportional control valve 272 receives hydraulic fluid under pressure from the main hydraulic supply conduit 268 and then returns hydraulic fluid to a main hydraulic return line 274.

The fluid from return line 274 goes through a thermostatically controlled valve 276 which, depending upon the temperature of the return fluid, either directs it through a cooling radiator 278 or bypasses radiator 278 by bypass line 280, and by either means returns the fluid to sump 256.

Returning now to the description of the hydraulically powered pumps, such as pump 116 of FIG. 5, attention is once again directed to the upper right hand corner of FIG. 7. There seven proportional control valves for controlling the hydraulic pump motors of the positive displacement pumps of metering systems 44 through 56 of liquid tanks 1 through 7, respectively, are shown and indicated by the labeling PCV1 through PCV7, respectively. The proportional control valve 272, which is labeled PCV1, indicates the proportional control valve for tank 1. Similarly, the proportional control valve labeled PCV2 indicates the proportional control valve for the hydraulic pump motor of liquid tank 2.

Proportional control valves PCV1 through PCV7 are physically arranged adjacent each other in a bank of control valves generally designated by the numeral 282, the physical position of which is schematically illustrated in FIG. 3. Each of the proportional control valves PCV1 through PCV7 may be either operated manually or by an automatic control system.

As was previously described with regard to FIG. 6, each of the dry material metering systems 58 through 68 includes a screw conveyor such as screw conveyor 136 and an air lock such as air lock 138. Screw conveyor 136 and air lock 138 each are hydraulically powered and therefore include a hydraulic motor for driving the same.

Referring now to the middle right hand portion of FIG. 7, a second bank of proportional control valves 284 is labeled PCV8 through PCV13. PCV8 controls the flow of hydraulic fluid under pressure to a hydraulic motor 286 for screw conveyor 136 and a hydraulic motor 288 for air lock 138. The hydraulic motors for the screw conveyors are designated by the labels MS, and the hydraulic motors for the air locks are designated by the labels MA.

It is noted that the hydraulic motor for the screw conveyor and for the air lock of each respective dry material metering system are connected in series so that hydraulic fluid is always simultaneously directed to the two power motors. In this manner, neither the screw conveyor 136 nor the air lock 138 may be operated without operating the other. This feature, in combination with a capacity of the air lock 138 being greater than a capacity of screw conveyor 136, prevents screw conveyor 136 from ever being blocked in so that it has no place to discharge the dry material carried thereby.

The physical location of second valve bank 284 is shown in FIG. 3.

Referring now to the bottom right hand portion of FIG. 7, a third bank of control valves designated generally by the numeral 290 includes control valves CV8 through CV13.

As previously indicated with regard to FIG. 6, each of the dry material metering systems such as system 58 includes a hydraulically powered butterfly valve, such as valve 132, between the metering bin and the storage bin 8. Each of the butterfly valves such as butterfly valves 132 includes a hydraulic cylinder such as hydraulic cylinder 292 for butterfly valve 132. The hydraulic cylinder 292 for butterfly valve 132 is labeled with the designation CBV which indicates a hydraulic cylinder for a butterfly valve. The designation CV8 indicates the control valve for the hydraulic cylinder 292 of butterfly valve 132 of tank 8.

The physical location of third bank of control valves 290, including control valves CV8 through CV13, is indicated in FIG. 3 as being directly below the location of second bank 284.

As previously described with regard to FIGS. 14-17, each of the dry material storage bins 8 through 13 and each of the metering bins contained in the dry material metering systems 58 through 68 includes a load cell supporting means which itself includes a hydraulic cylinder adapted to be extended upon the application of hydraulic pressure thereto, so as to move the load cell into load supporting engagement with its respective storage bin or metering bin.

For example, referring to FIG. 14, the load cell supporting means 148 for dry material storage bin 8 includes a hydraulic cylinder 152.

Referring now to the lower left hand portion of FIG. 7, a series of hydraulic cylinders are there illustrated. The hydraulic cylinders for the load cell support means of each of the inventory or storage bins 8 through 13 are labeled ILC8 through ILC13. The hydraulic cylinder 152 for the load cell support means for inventory bin 8 has been also indicated by the numeral 152 in FIG. 7 by way of illustration.

Similarly, the hydraulic cylinders for the load cell support means of the metering bins, such as metering bin 130, for each of the dry material metering systems 58 through 68 of dry material storage bins 8 through 13 are indicated by the labels MLC8 through ILC13.

As is shown in FIG. 7, each of the hydraulic cylinders for metering bin load cell support means MLC8 through MLC13 and for inventory bin load support means ILC8 through ILC13 are connected to main hydraulic supply conduit 268 so that when hydraulic fluid under pressure is supplied to main hydraulic supply conduit 268 thereby providing hydraulic power to the various hydraulic motors shown on the right hand side of FIG. 7, hydraulic pressure is also supplied to the hydraulic cylinders of each of the load cell support means so as to extend the hydraulic cylinders and move each of the load cell support means into load supporting engagement with its respective bin.

Referring again to the hydraulic power supply 254 in the upper left hand corner of FIG. 7, hydraulic power supply 254 includes a third power pump 294 for supplying hydraulic fluid under pressure to a motor 296 for powering conveyance blower 100 and to a motor 298 for powering an aeration blower (not shown).

The aeration blower driven by motor 298 provides compressed air to an aeration means in each of the dry material storage bins 8 through 13 for assisting the flow of the dry materials within the bins. Aeration means 299 of storage bin 8, see FIG. 14, is preferably a canvas type liner inside the lower tapered walls of the bin. The canvas liner is inflated with air from the aeration blower. The pressurized air slowly flows through the canvas liner into the dry material and tends to fluidize the dry material so that it readily flows out the bottom of bin 8.

The third supply pump 294 takes suction from hydraulic sump 256 through a suction line 300. A strainer 302 is disposed in suction line 300. A discharge line 304 connects the discharge of pump 294 to a flow divider 306 which splits the discharge from pump 294 and directs it through conduits 308 and 310 to the motors 296 and 298, respectively, for the conveyance blower and the aeration blower. The return fluid from motor 296 is directed to main hydraulic return line 274 through a conduit 312.

The valves of the first and second banks, 282 and 284, of proportional control valves are spool type valves which operate under pilot pressure. The return fluid from motor 298 is directed through pilot pressure supply line 314 to valve banks 282 and 284. The pilot fluid is returned to sump 256 by a pilot fluid return line 316.

A conventional flow controller (not shown) may be used ahead of each of the hydraulic motors shown in FIG. 7 to prevent damage to those motors. Also, conventional pressure relief valves (not shown) are desirably placed in conduits 266, 304, 308, 310 and 314.

To control the operation of the elements described hereinabove, the present invention includes the control station means 38. Broadly, the control station means 38 includes means for determining the amount of additive being discharged from an additive container, means for sensing the amount of primary substance being discharged from a primary substance container, and means, responsive to both the additive substance determining means and the primary substance sensing means, for controlling the amount of additive being discharged from the additive container.

In one embodiment, the additive determining means includes means, such as one or more of the hydraulic load cells of the metering bin load cell support means, for detecting the weight of a first portion of the additive and for generating a first electrical signal proportional to the detected weight. In a second embodiment the additive determining means includes means, such as one or more of the flowmeters 122 associated with the discharge lines of the liquid tanks, for monitoring the volumetric flow rate of the additive and for generating an electrical signal proportional to the monitored flow rate. Each of these electrical signals is used by the controlling means, which in the preferred embodiment includes a microprocessor.

The primary substance sensing means includes means, such as the main flowmeter 97 located in the discharge line of the primary fluid supply, for generating an electrical signal proportional to the flow rate of the sensed primary substance. This primary substance may either be the unblended substance to which the additive is to be combined (e.g., the fracturing fluid from the supply 94) or it may be the blended fluid obtained after the blending has occurred (e.g., the blended fluid at the outlet of the pump 90). Regardless of which substance the sensing means detects, the generated proportional electrical signal is provided to the controlling means for use thereby, along with the electrical signal obtained from the additive determining means, for controlling the subsequent amount of additive discharged from its container.

The primary substance sensing means further includes means for simulating a flow rate of the primary substance and for generating a second electrical signal proportional to the simulated flow rate. Also included is means for switchably communicating the first electrical signal generating means and the simulating and generating means with the controlling means. In this way either the actual primary substance flow rate or a simulated flow rate is entered and used by the controlling means for controlling the amount of the additive discharged into the substance with which it is to be blended.

The controlling means includes means for comparing the actual amount of additive substance discharged with a predetermined reference level, such as the required amount to be discharged as calculated from the actual or simulated flow rates of the primary substance. The controlling means further includes means, responsive to the comparing means, for creating an error signal when the discharged amounts do not favorably compare with the predetermined reference value. The controlling means further comprises an input and readout means.

More specifically, and with reference to FIGS. 19-27C in general and to FIG. 19 in particular, a preferred embodiment of the control station means 38 will be described. FIG. 19 discloses that the station means 38 includes a control unit 350 which is responsive to an additive unit 352 (such as one or more of the previously described metering means), having means for determining the amount of an additive being discharged therefrom, and a primary substance unit 354 (such as the fluid supply 94, conduit 96 and main flowmeter 97 group), having means for sensing the amount of a primary substance being discharged therefrom, as depicted by the arrows 356 and 358, respectively. In response to inputs from the additive unit 352 and the primary unit 354, the control unit 350 controls the amount of the additive being discharged from the additive unit. The control is represented by the arrow 360 and the additive unit discharged is represented by the arrow 362.

The amount of additive which is discharged from the additive unit 352 is blended in a blender unit 364, which includes the blender tub 86, with the primary substance which is discharged from the primary substance unit 354 as represented by the arrow 366. Upon blending in the blender 364, the desired blended substance is obtained therefrom.

It is to be noted that the FIG. 19 embodiment discloses the control unit 350 as responsive to input received from the primary substance unit prior to the primary substance being blended with the additive; however, the control unit 350 can also function when the input received from the primary substance unit 354 corresponds to the status of the final blended substance such as would be provided at the output of the pump 90.

For purposes of simplifying the following description, it will be assumed that the control unit 350 monitors the primary substance prior to its entry into the blender unit 364.

FIG. 20 shows the control unit 350 more particularly includes an operation control unit 368 and a data input and data readout unit 370, as well as a portion of each of a dry metering system control unit 372, a liquid metering system control unit 374, and a main flowmeter monitor unit 376. Also in the particular embodiment of FIG. 20 it is shown that the additive unit 352 includes another part of the dry metering system control unit 372 and the liquid metering system control unit 374. As will become apparent, certain elements of the metering system control units 372 and 374 are disposed within the previously described dry material and liquid material metering means; however, these elements are functionally related to and electrically connected within the control station means 38. FIG. 20 further discloses that the primary substance unit 354 more particularly includes a portion of the main flowmeter monitor unit 376.

With reference to FIGS. 21–27C, a more detailed description of the elements of the FIG. 20 embodiment will be presented.

FIG. 21 discloses that the operation control unit 368 of the controlling means 350 includes a central processing unit 378. This central processing unit provides means for comparing the actual amount of discharged additive with a predetermined reference value and means, responsive to the comparing means, for creating an error signal when the actual discharged amount does not favorably compare with the predetermined reference value. In the preferred embodiment the comparing means and the error signal creating means are implemented with a microprocessor and an associated, program-containing memory of suitable types as are known in the art. In the preferred embodiment the microprocessor is an eight-bit type and the memory includes both ROM and RAM components.

FIG. 21 shows that the central processing unit 378 is connected to a mode selection switch 380 for selecting, in the preferred embodiment, any one of four modes. As shown in FIG. 21, these modes include off (OFF), stand-by (STDBY), local (LOCAL), and blender flowmeter (BLDR FM) and are entered in the central processing unit 378 over two input lines. The local mode may operate either with or without the main flowmeter 97 as will be described further hereinbelow. Each of these modes will be discussed further hereinbelow with reference to the operation of the control station means 38.

Also associated with the central processing unit are a device select, or address, bus 382 and a bi-directional data bus 384. The address bus 382 is driven by a device select decoder means 386 which is controlled by the central processing unit 378. The buses 382 and 384 provide the controlling means 350 with means for accessing and acquiring information from the elements to which the buses are connected as subsequently described. For the preferred embodiment eight-bit microprocessor of the present invention, the address bus 382 and the data bus 384 each includes eight separate lines.

Connected to a respective one of the address lines of the address bus 382 and to a respective one of the data lines of the data bus 384 is a dry additive inventory bin value switching means 388 comprising a logic gate 390 and control power transistors 392 and having a function as subsequently described. In the preferred embodiment the logic gate 390 is a flip-flop and the transistors 392 include both a VMOSFET control transistor driven by the flip-flop and a bipolar power transistor driven by the VMOSFET.

FIG. 21 shows that the address bus 382 and the data bus 384 provide other address and data information as will be subsequently described. Although this various address and data information is shown in FIG. 21 to go to only one dry additive inventory bin, one dry additive metering bin and one liquid additive tank, the control station means 38 can control the plurality of dry additive inventory and metering bins and liquid additive tanks previously described. That is, with reference again to FIG. 20, the operation control unit 368 as shown therein can communicate with a plurality of dry metering system control units 372 and a plurality of liquid metering system control units 374. Only single ones of these units have been shown for purposes of simplicity of explanation.

FIG. 21 further discloses that the controlling means 350 includes memory means 394, including ROM and RAM components as previously mentioned, with which the central processing unit 378 communicates over the data bus 384.

Figure 22:
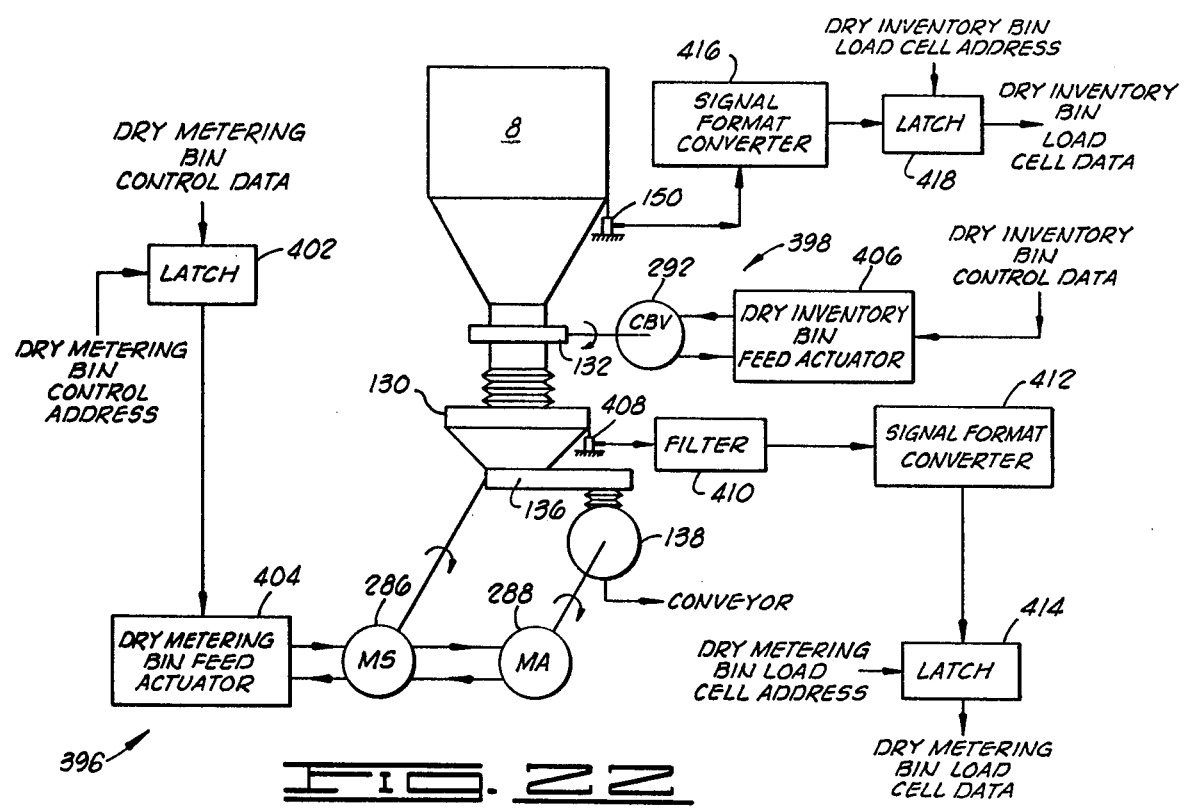
FIG. 22 is a schematic and functional block diagram of the dry metering system control unit of the FIG. 21 embodiment.

The controlling means 350 further includes means 396 for discharging the dry additive from a dry additive metering container and means 398 for releasing the dry additive from a dry additive inventory container, which means forms a part of the dry additive control system unit 372 shown in FIG. 22. The controlling means also includes means 400 for discharging the liquid additive from a liquid additive container, which means forms a part of the liquid additive control system unit 374 shown in FIG. 20.

FIG. 22 shows the means 396 for discharging the dry additive from a dry additive metering container includes a logic circuit latch means 402 which stores, under control of the dry metering bin control address sent over the address bus 382, the dry metering bin control data sent over the data bus 394 by the central processing unit 378. The latch 402 output is connected to the input of a dry metering bin feed actuator means 404 which includes, for a respective dry material metering bin, one of the proportional control valves of valve bank 284 connected within the hydraulic system of the present invention. The actuator means 404 is associated with a hydraulic motor, such as the hydraulic motor 286, to vary the speed thereof in response to the latch 402 data for controlling the rotation of a dry additive conveyance means, such as the screw conveyor 136. This control of the conveyance means provides control of the rate at which the dry additive is discharged. The dry metering bin feed actuator means 404 also controls the operation of a motor which drives an air lock, such as the hydraulic motor 288 for the air lock 138, used in further moving the discharged additive.

The releasing means 398 of the controlling means 350 is shown in FIG. 22 to include a dry inventory bin feed actuator means 406, having a respective one of the hydraulic control valves of bank 290, for controlling the hydraulic fluid flow to a hydraulic cylinder, such as the cylinder 292, and thereby controls the operation of a shut-off valve, such as the butterfly valve 132. The dry inventory bin feed actuator 406 responds to a control signal provided by the inventory bin valve switching means 388 shown in FIG. 21.

In addition to disclosing the discharging means and releasing means of the controlling means 350, FIG. 22 shows a schematic and functional block diagram of the additive unit 352 dry additive determining means portion of the dry additive metering system control unit 372. FIG. 22 schematically shows that a first portion of the dry additive to be metered is contained within a dry additive metering container, such as the metering bin 130, and that a second portion of the dry additive is contained within a larger dry additive inventory container, such as the inventory bin 8, which is coupled to the metering bin 130 as previously described and illustrated with reference to FIG. 6.

So that the amount of additive discharged from the metering container 130 by means of the discharging means 396 can be determined, the dry metering system control unit 372 includes means for detecting the weight of the first portion of the additive and for generating an electrical signal proportional to the detected weight. This detecting means is identified by the reference numeral 408 in FIG. 22 and is preferably the hydraulic load cell means of the load cell support means 162 associated with the metering container 130 for detecting the weight of the metering container and the dry additive contained therein as shown in FIGS. 14 and 15. When the hydraulic load cell 408 is fully loaded with the weight of the container and its contents, it generates an electrical signal, which is proportional to the percentage of the weight supported by the support means 162. This signal is coupled to a filter means 410 for filtering a predetermined range of frequencies from the generated proportional electrical signal to remove unwanted noise such as arises from mechanical vibrations within the structure holding the additive containers. For example, in using the present invention for storing and metering additives in an oil field environment, several tens or hundreds of pounds of mechanical vibration can arise from the operation of the necessary hydraulic and other mechanical equipment and thereby cause unwanted noise in the electrical signal representing the weight of the additive and its container. Clearly, such noise would cause spurious weight computations by the controlling means 350, so the noise must be filtered by the filter means 410. Although the load cell 408 is preferably a hydraulic type to damp these mechanical vibrations, the damping achieved thereby is inadequate so that the filter 410 becomes necessary.

FIG. 22 next shows that the filtered signal is applied to a means 412 for converting the filtered electrical signal into a digitally-coded format. This digitally-coded signal is then transferred to means 414 for retaining the signal for acquisition by the controlling means. In particular, the retaining means 414 is a logic circuit latch which loads the digitally-coded signal therein under control of a time-base means, such as a quartz crystal clock, which forms a part of the controlling means 350. The stored information is retrieved by the central processing unit 378 when the central processing unit sends the dry metering bin load cell latch address along the address bus 382. Upon activation of the latch 414, the digitally-coded data is present for acquisition by the central processing unit 378 over the data bus 384. Thus, the latch 414 is a memory means for storing the digitally-coded signal.

FIG. 22 also shows that the dry additive determining means of the additive unit 352 includes means for sensing the weight of the dry additive inventory container 8 and the dry additive contained therein and for generating an electrical signal proportional to this sensed weight. In a preferred embodiment this sensing means is the electronic load cell 150 of the load cell support means 148 associated with the storage means 8. When loaded with the weight of the container 8 and its contents, the load cell 150 generates an electrical signal which is connected to means for converting it into a digitally-coded format, which converting means is identified in FIG. 22 by the reference numeral 416. This converted signal is latched into a memory means 418 for retaining the digitally-coded signal for acquisition by the controlling means over the data bus 384. As with the retaining means 414, the memory means 418 is a logic circuit latch means loadable under control of the time-base means and accessible over the address bus 382 and the data bus 384.

Figure 23:
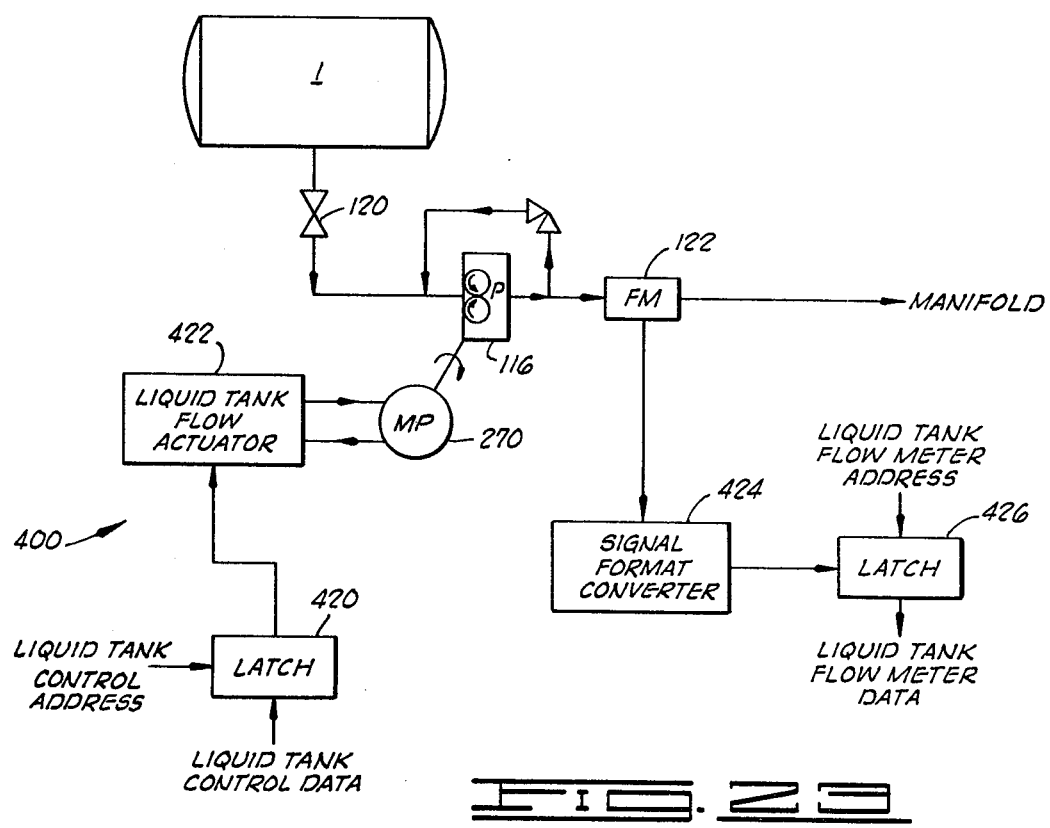
FIG. 23 is a schematic and functional block diagram of the liquid metering system control unit of the FIG. 21 embodiment.

FIG. 23 discloses that the means 400 for discharging the liquid additive from a liquid additive container includes a latch means 420 for storing the liquid tank control data transmitted to it over the data bus 384 by the central processing unit 378. The latch means 420 is connected to a liquid tank flow actuator means 422 having a proportional control valve, such as the valve 272, and appropriate hydraulic apparatus for controlling a hydraulic pump motor such as the motor 270, which drives a pump, such as the positive displacement pump 116. By varying the speed of the motor 270 via control signals from the central processing unit 378, the speed of the pump 116, and thus the rate of the additive pumped therethrough, are controlled.

FIG. 23 further shows the preferred embodiment of the portion of the liquid metering system control unit 374 forming a part of the additive discharge determining means of the additive unit 352. This portion of the unit 374 is shown to include a liquid additive container, such as the liquid storage tank 1, from which the liquid additive is discharged through the valve 120 under force from the pumping action of the pump 116. The liquid is pumped through a means for monitoring the volumetric flow rate of the additive substance and for generating an electrical signal proportional to the monitored flow rate. In FIG. 23 this monitoring means is shown to be the flowmeter 122. The output of the flowmeter 122 is connected to means 424 for converting the electrical signal into a digitally-coded format. As with the previous digitally-coded signals, this converted signal is stored in memory means, such as a logic circuit latch 426, for acquisition by the central processing unit 378 over the data bus 384.

Figure 24:
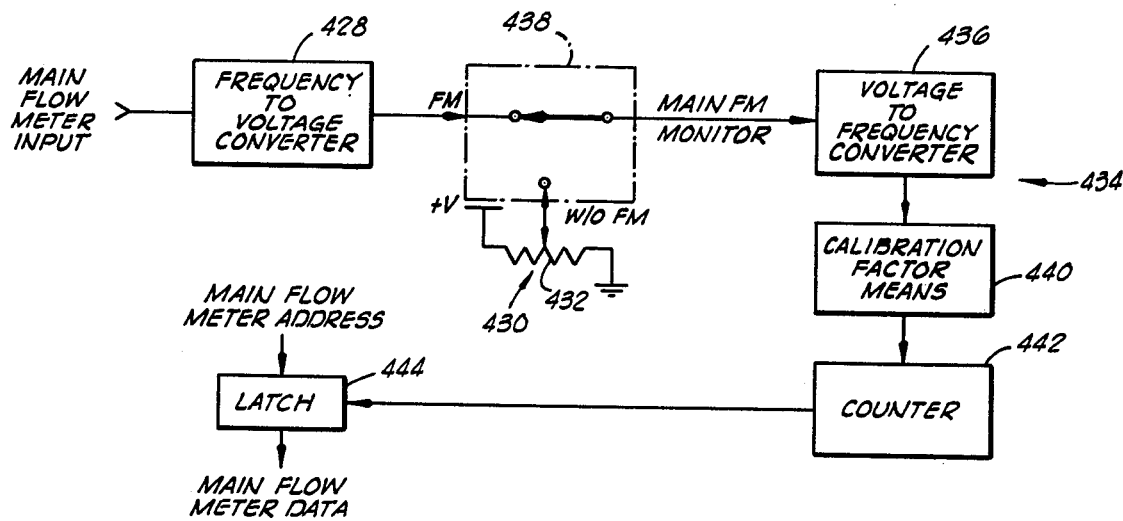
FIG. 24 is a schematic and functional block diagram of the main flowmeter monitor unit of the FIG. 21 embodiment.

FIG. 24 shows a preferred embodiment of the main flowmeter monitor unit 376 which constitutes the primary substance discharge sensing means of the primary substance unit 354. The main flowmeter input referred to in FIG. 24 is received from the main flowmeter 97 which is located within the discharge line 96 of the supply 94 as shown in FIG. 4 and as functionally represented in FIG. 19. This main flowmeter provides means for generating an electrical signal proportional to the flow rate of the sensed primary substance as it flows from the primary substance unit 354. This electrical signal is converted into a proportional voltage level by a frequency-to-voltage converter means 428.

More particularly, the frequency-to-voltage converter means 428 includes an amplify-and-square circuit of the type known in the art. The input of the amplify-and-square circuit is connected to the alternating electrical signal which is generated by the main flowmeter, and the alternating output of the circuit is applied to a phase-locked loop which effectively multiplies the frequency of the output signal by ten. This increased-frequency signal is then input into a frequency-to-voltage converter circuit to convert the alternating electrical signal into a corresponding voltage level.

FIG. 24 also shows that the primary substance sensing means includes means for simulating a flow rate of the primary substance and for generating an electrical signal proportional to the simulated flow rate. This simulating and generating means is identified by the reference numeral 430 in FIG. 24 and is particularly shown to include a potentiometer 432.

The primary substance sensing means also includes means for switchably communicating the electrical signal from the converter means 428 representing the actual flow rate of the sensed primary substance and the electrical signal from the simulating and generating means 430 with the operation control unit 368 of the controlling means 350. This switchable communicating means is generally referred to by the reference numeral 434 in FIG. 24. The switchable communicating means 434 includes means 436 for converting a voltage level into an alternating electrical signal having a frequency corresponding to the input voltage level. The communicating means 434 further includes switch means 438 for selectably coupling the voltage level from the frequency-to-voltage converting means 428 and the voltage level from the simulating means 430 to the voltage-to-frequency converting means 436. In FIG. 24, the switch 438 has a first terminal connected to the output of the frequency-to-voltage converter 428 and a second terminal connected to the wiper arm of the potentiometer 432. The preferred embodiment of the switchable communicating means 434 further includes means 440 for calibrating the frequency of the alternating electrical signal output from the converting means 436. FIG. 24 shows that the output of the calibration means 440 is coupled to a logic circuit counter means 442 providing output which is latched into a storage means 444, such as a logic circuit latch, for acquisition by the central processing unit 378 over the data bus 384.

In the preferred embodiment the calibration means 440 is a logic circuit divide-by-N counter. The counter has thumb-wheel switches connected to appropriate inputs thereof as known in the art so that the calibration factor by which the frequency of the alternating signal from the voltage-to-frequency converting means 436 is to be divided may be input. Once the calibration factor has been set and the frequency divided, the output of the counter is provided to the counter means 442 for generating a count which is then latched into the storage means 440.

Figure 25:
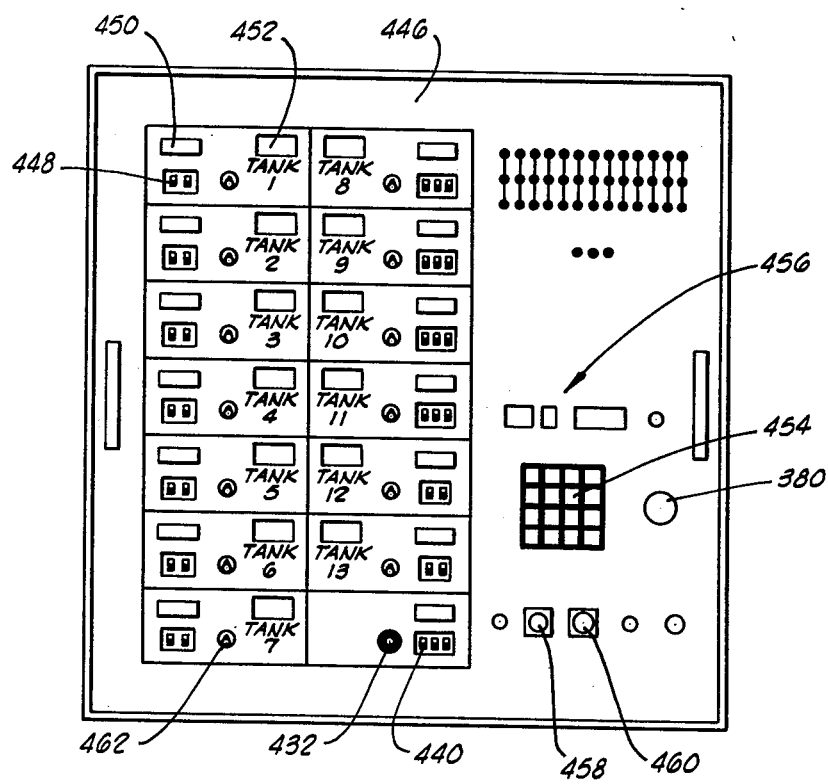
FIG. 25 is an illustration of the input and readout panel of the data input and data readout unit of the FIG. 21 embodiment.

FIG. 25 is an illustration of an input and display panel 446 of the data input and data readout unit 370 of the prevent invention. It is through this panel that manual commands may be made to the operation control unit 368. As will be noted, the panel disclosed in FIG. 25 indicates that thirteen tanks, or dry and/or liquid containers, are in the metering control system and thus are controlled by the operational control unit 368. In the FIG. 25 embodiment these thirteen positions, or channels, each represents a respective one of the seven liquid additives (TANKS 1–7) and six dry additives (BINS 8–13) which are to be stored in and metered from the previously described apparatus. With this number of additives to be metered, the FIG. 20 embodiment would contain seven liquid metering system control units 374 and six dry metering system control units 372 to effect the embodiment depicted in FIG. 25.

Figure 26:
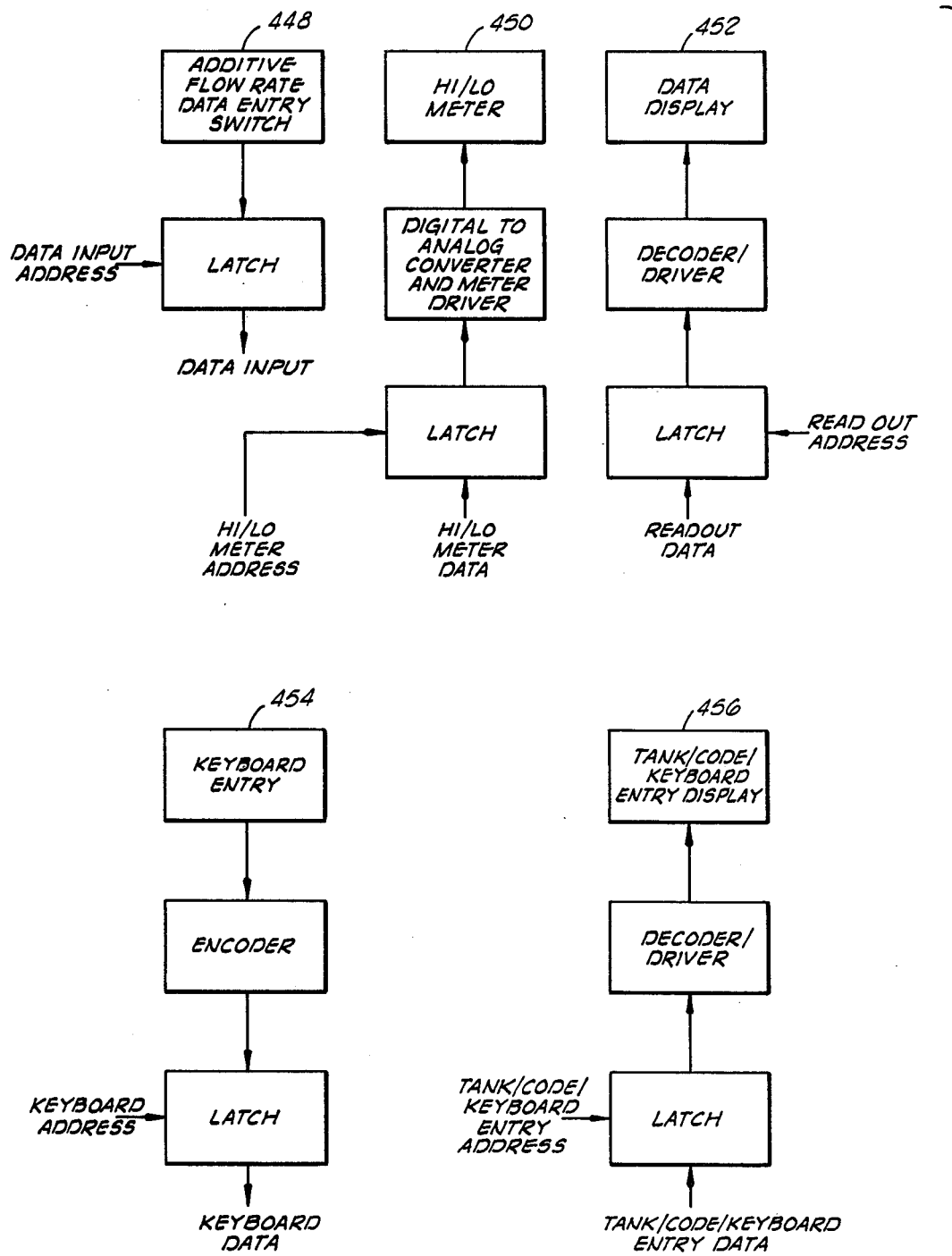
FIG. 26 is a functional block diagram depicting elements of the data input and data readout unit of the FIG. 21 embodiment.

With reference to both FIGS. 25 and 26, the elements of the data input and data readout unit 370 as shown on the panel 446 will be described. The panel 446 includes a plurality of thumbwheel switches 448 by which a first required additive flow rate may be entered. The entry is made by turning the thumbwheel switch of the respective additive channel with which it is associated to the appropriate rate setting and then having the entry latched into a latch under control of the central processing unit 378 via the address bus 382 and the data bus 384 as shown in FIG. 26. This first required flow rate is used by the central processing unit when it is in the LOCAL, or manual, mode as set by the mode switch 380.

FIG. 25 also shows that the panel includes a needle meter 450 in each channel for perceptibly displaying an error signal indicating whether the actual flow rate of the additive is above or below the desired flow rate. The meter 450 is controlled by the central processing unit sending a data control word to the latch shown in FIG. 26 to be associated with each meter and then latching the word therein for subsequent conversion by a digital-to-analog converter and display by the meter 450.

Each additive channel within the metering system also has a data display means 452, such as a liquid crystal display, as shown in FIG. 25. This displays pertinent channel information as provided by the central processing unit 378 over the data bus 384 and latch into a latch and decoded for driving the data display as shown in FIG. 26.

The panel 446 also includes a keyboard 454 for entering other data such as density and concentration levels. The keyboard entered data is displayed by a tank-/code/keyboard entry display means 456, such as a liquid crystal display. As an entry is made through the keyboard, the tank channel to which it is to be applied is displayed in the tank display, the code representing the nature of the entered data (such as whether the entry represents density or concentration) is displayed, and the actual data (e.g., density or concentration) itself is displayed. These panel elements are also controlled by the central processing unit 378 through the elements as shown in FIG. 26.

The panel 446 is further shown in FIG. 25 to include a main flowmeter input 458 for coupling with the output of the main flowmeter of the primary substance unit 352 (i.e., the flowmeter 97), a remote control input 460 for interfacing with a remote control unit, and channel feed on/off switches 462. The position of the channel feed on/off switches 462 determines whether the respective channels are in use and thus are to be monitored and controlled by the central processing unit 378 as subsequently described. Also shown on the panel 446 are the potentiometer 432 control knob and the thumbwheel switches for entering the calibration factor of the calibration means 440.

The keyboard 454 and the other data entry elements mentioned above provide means for varying the various reference levels which are used by the central processing unit 378 in metering the additives.

With reference to all the drawings in general, the operation of the present invention will be described. Initially, the data required for the central processing unit 378 to properly meter the additive of each channel within the system is entered through the channel thumbwheel switches 448 and the keyboard 454. The data entered into the channel thumbwheel switches establishes the desired rate that the additive is to be discharged from its metering container when the mode selection switch 380 is in either one of the local modes. The data entered through the keyboard 454 includes such parameters as the desired concentration of additive to be blended with the primary substance and the density of the dry additive contained in the dry additive containers. Also, the main flowmeter calibration factor is entered by appropriately setting the calibration thumbwheel switches 440, and the simulated main flowmeter flow rate is set by appropriately adjusting the potentiometer 432. Additionally, each of the switches 462 is placed in the feed position if the metering of that channel is to be controlled by the central processing unit 378. Further, the appropriate mode is selected via the mode switch 380.

Once the data is entered, the central processing unit 378 checks the status of the feed switches 462 and whether the desired concentration is entered for each channel. If the channel feed switch is on and the channel's desired concentration level entered, the central processing unit 378 meters the additive discharged from that channel. It is to be noted that this data can be changed, or newly entered for previously inactive channels, even after this initial entering and checking; however, the abovementioned initial data entry and status checking functions are performed when the present invention commences its operation.

Having determined which channels are active, i.e., which channels have their switches 462 in the feed position and their concentrations entered, the central processing unit 378 determines whether it is to operate in the local mode or the blender FM mode by accessing the data as set by the mode switch 380. The central processing unit stores this information for later use. It is to be noted that metering control occurs only in either the local (manual) mode or blender FM (automatic) mode; no metering occurs if the mode switch is in either its off or standby positions because these are inactive or data entry only modes. When the local mode is selected, it can be chosen to use either the actual main flowmeter rate ("FM" position of switch 380) or the simulated flowmeter rate ("w/o FM" position of switch 380) in its controlling functions as more fully discussed below.

For each active liquid channel the central processing unit 378 performs the following functions. First, it accesses the data stored in the main flowmeter latch 444 to determine if the flow rate of the main flowmeter (actual flow rate if in local FM mode or simulated flow rate if in local w/o FM mode) is above a predetermined low level. Next, the central processing unit accesses the liquid tank flowmeter latch 426 to determine the actual flow rate of the additive being discharged from the respective liquid additive container of the particular channel (e.g., tank 1). The central processing unit 378 then determines the require flow rate of the channel for the automatic (blender FM) mode, regardless of the mode switch 380 setting, based on the entered concentration level and the actual main flowmeter flow rate. The central processing unit also determines the required flow rate for the local mode based on the information entered in the respective channel thumbwheel switch 448.

Having determined the actual channel flow rate and the required channel flow rates, the central processing unit 378 calculates the error therebetween by subtracting the actual value from the required value. In other words, the controlling means 350 compares the actual value to a predetermined reference level, i.e., the calculated required value. If the central processing unit 378 has previously determined that it is in the blender FM mode (automatic mode), then the actual rate is subtracted from the required flow rate based on the concentration and actual main flowmeter rate. If the processing unit is in the local mode, it uses the required flow rate calculated on the basis of the setting of the channel thumbwheel switch 448. The calculated error, which may be positive or negative, is appropriately scaled and added to the currently stored metering control word, and the resultant corrected word is communicated to the liquid tank control latch 420. When this word is latched into the latch 420, the liquid tank flow actuator means 422 uses it to control the speed of the pump motor, such as the motor 270, thereby correcting the speed of the pump, such as the pump 116, to establish the desired flow rate. Particularly, in the preferred embodiment the latched information actuates the proportional control valve of the actuator means 422 to control the flow of hydraulic fluid to the hydraulic pump motor. In addition to being used to compute the correction word, the error value is output to the high/low meter latch, shown in FIG. 26, for conversion and driving of the channel high/low meter 450.

For each dry additive channel, the central processing unit 378 performs the following functions. First, it checks the inventory container, or bin, load cell latch 418 to determine the weight of the dry additive stored in the inventory bin, such as the bin 8. This determination is based upon the previously entered density of the stored additive, the predetermined volume of the inventory bin and the predetermined weight of the bin.

Next, the central processing unit 378 determines if the metering container, such as the metering bin 130, is being filled. If it is, the central processing unit 378 loops to the next channel to be monitored and metered. If the metering container is not being filled, the central processing unit 378 calculates the required amounts of dry additive to be discharged for the automatic blender (blender FM) and manual (local) modes similar to the calculations performed for each of the active liquid additive channels. The processing unit then determines the actual weight change over a predetermined period of time of the dry additive stored in the dry additive metering container. This is done by reading the contents of the dry metering bin load cell latch 414 at a first time, waiting the predetermined period of time, again reading the latch 414 contents, subtracting the values of the two latch readings and then dividing by the predetermined time period.

Next, the central processing unit determines if it has a true material delivery by comparing each of two successive actual dry additive rates to a predetermined value. If the two rates are below the predetermined level, the central processing unit starts the screw conveyor motor, such as the motor 286, at its maximum speed for a short period of time, such as a fraction of a second. This drive speed control is effected by outputting the appropriate command word to the drive metering bin control latch 402. At the expiration of the short period of time, the drive is reduced and the central processing unit proceeds to its next operation.

This next operation is to calculate the error between the required and actual rates similar to that done for the liquid additive channel. This dry additive error signal is appropriately scaled and used similarly to the liquid additive error signal to establish a corrected metering control word which is output to the dry metering bin control latch 402 for adjusting the speed of the motor and the screw conveyor (such as the motor 286 and the screw conveyor 136) driven thereby. The dry additive error signal is also used to drive the respective high/low meter 450.

After the central processing unit 378 has adjusted the metering speeds of each of the liquid and dry channels as above described, the central processig unit checks the metering container of each active dry additive channel to see if it needs to be filled. The central processing unit initially computes the actual weight of the additive within the respective metering container. As mentioned above with respect to the monitoring of the contents of the inventory container, the weight of the additive in the metering container is determined by utilizing the previously entered density of the dry additive, the predetermined volume of the metering container, and the predetermined weight of the container. If the metering bin has been filling for a predetermined time, the central processing unit 378 detects this and shuts-off the inventory bin control valve, such as the valve 132, by outputting the appropriate command through the inventory bin valve switching means 388. If the bin has not been filling for this predetermined time, the processing unit 378 compares the computed actual additive weight with a predetermined high limit value. If the actual weight exceeds the high limit value, the control valve is shut-off. The central processing unit then compares the actual weight with a predetermined low limit. If the actual weight is below the low limit, the control valve is opened by means of a signal from the valve switching means 388 to release the dry additive from the inventory container and thereby fill the metering container. Through this operation the central processing unit determines, during its metering of the dry additive channels, whether the metering bins are being filled. In the preferred embodiment the high limit value is set at a weight which indicates that the metering container is three-fourths full and the low limit value is set at a weight which indicates that the metering bin is one-fourth full.

It is to be noted that the above computations, such as the subtracting of actual values from required values, are made on the basis of normalized values, i.e., values which are in the same units. For example, the actual and required liquid additive flow rates may be normalized to have units of gallons per minute or the like. This normalization may be done by, for example, scaling the digitally-code signals processed by the central processing unit.

Figure 27B:
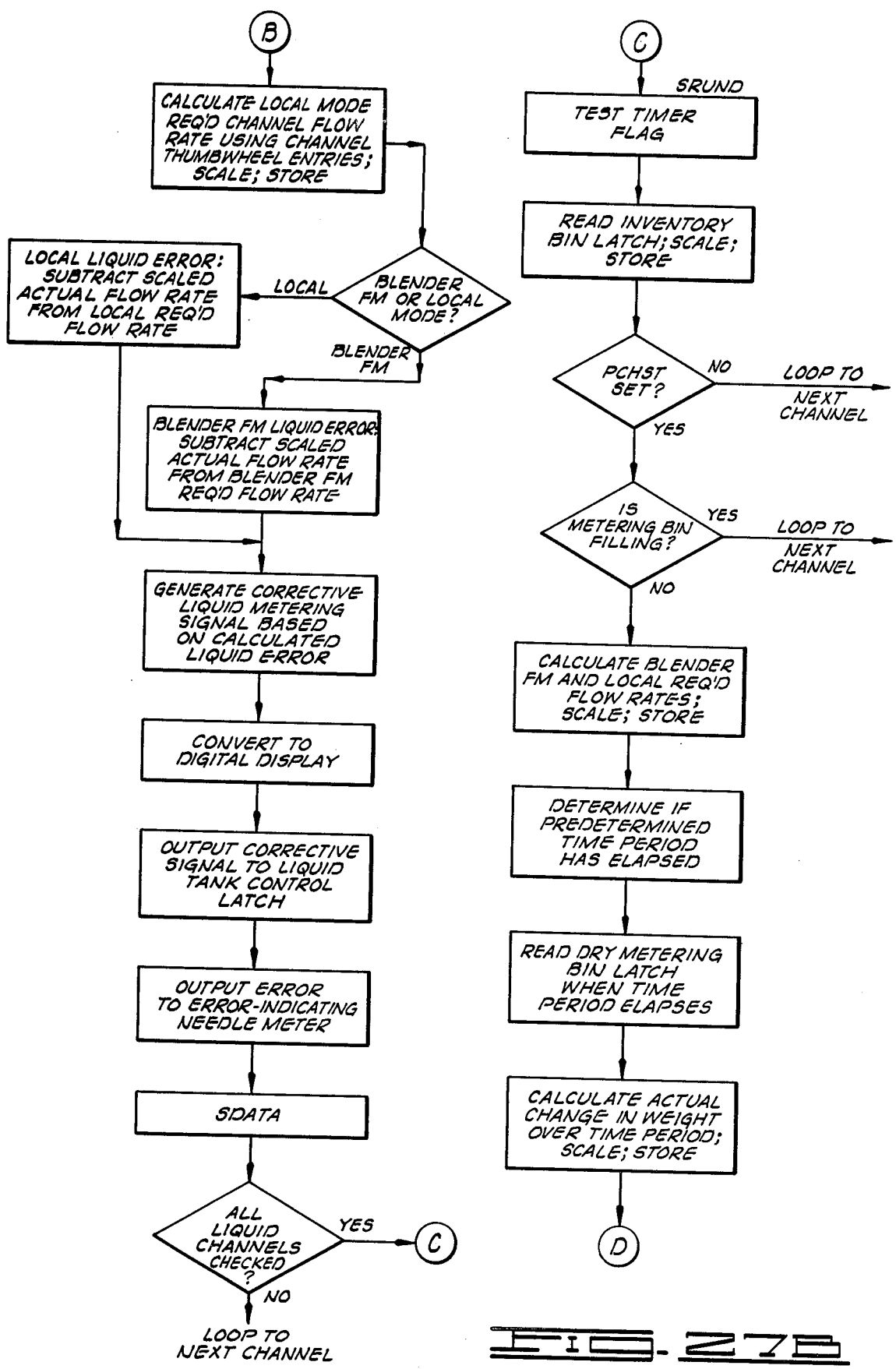
Figure 27C:
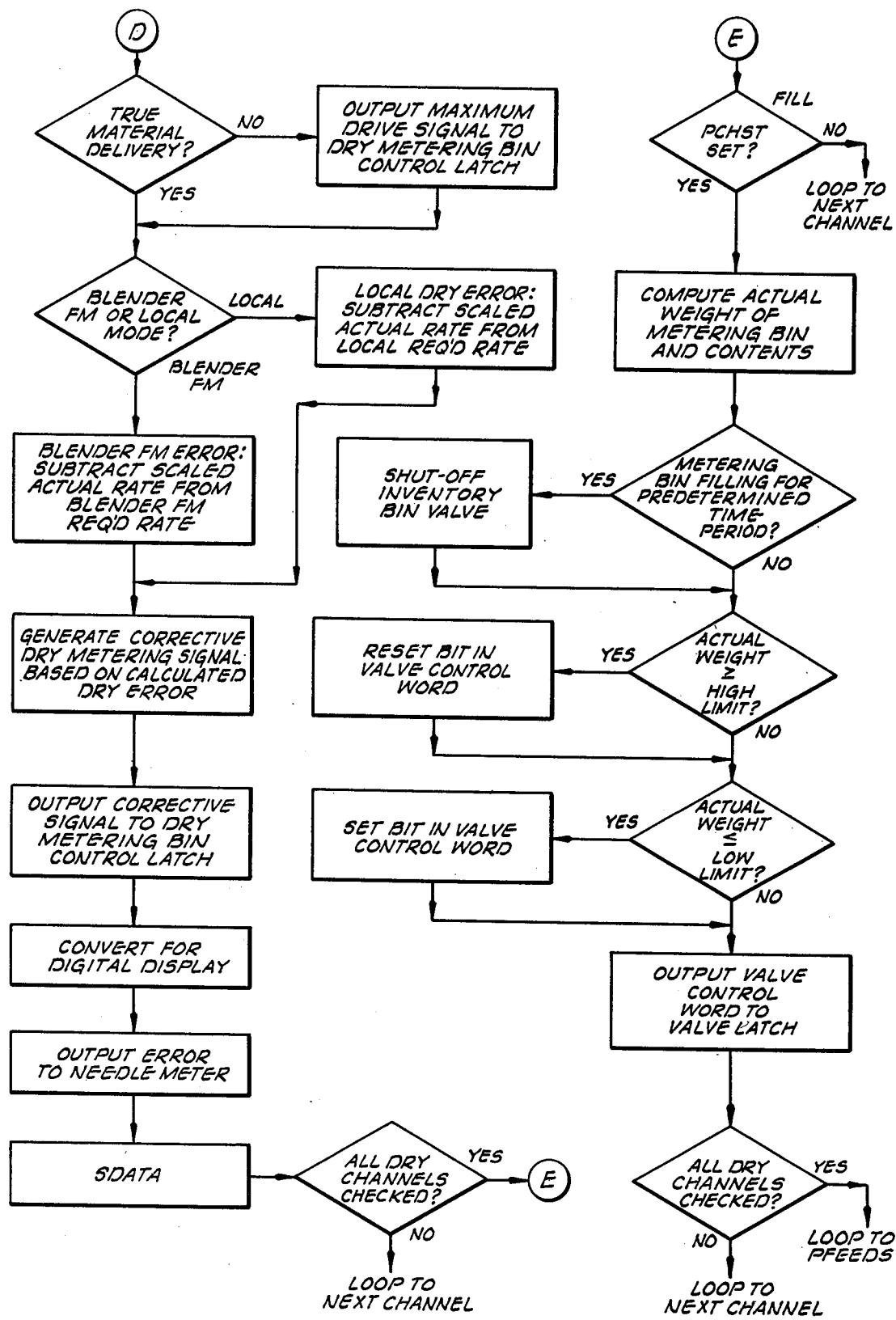

These operations are carried out under the direction of a program stored in the memory 394. A flow chart of this program is shown in FIGS. 27A–27C. Through the interaction of the microprocessor, memory and the program stored therein, which elements form a part of the central processing unit 378, it is apparent that the present invention includes the various means for performing the above-described functions.

From the foregoing it is apparent that the present invention utilizes both the actual amounts of additive discharged (e.g., the liquid additive flow rates and the dry additive weights) and the amount of primary substance discharged (e.g., the actual flow rate of the primary substance or the simulated flow rate), as well as the concentration, density and desired flow rate values entered through the data input and data readout display panel 446, to achieve continuous automatic metering of both liquid and dry additives.

Thus, it is seen that the controlled additive material storage and metering system of the present invention is readily adapted to achieve the ends and advantages mentioned as well as those inherent therein. While presently preferred embodiments of the invention have been illustrated for the purpose of this disclosure, numerous changes in the arrangement and construction of parts may be made by those skilled in the art, which changes are encompassed within the spirit and scope of this invention as defined by the appended claims.

What is claimed is:

1. A material storage and metering system, comprising:
   first storage means for storing a first solid phase material;
   first metering means for transferring said first material from said first storage means at a controlled flow rate within a first range of flow rates for blending with a flowing primary substance, said first range being defined with a low end and a high end;
   second storage means, for storing a second solid phase material;
   second metering means for transferring said second material from said second storage means at a controlled flow rate within a second range of flow rates for blending with said flowing primary substance, said second range being defined by a low end and a high end, said high end of said second range being at least substantially as great as said low end of said first range; and
   control station means, responsive to the flow rates of said first and second materials, and to a flow rate of said primary substance, for providing the controlled flow rates of said first and second materials, said control station means including:
      material determining means for determining the amounts of said first material and said second material being discharged from said first storage means and said second storage means;
      primary substance sensing means for sensing the amount of said primary substance being discharged from a primary substance container; and
      controlling means, responsive to said material determining means and said primary substance sensing means, for controlling the amounts of said first and second materials being discharged from said first and second storage means;
   wherein said first metering means includes:
      metering bin means for receiving said first material from said first storage means; and
      conveyor means, controlled by said controlling means, for discharging said first material from said first metering bin means at said controlled flow rate within said first range of flow rates.

2. The system of claim 1, wherein: said conveyor means includes a screw conveyor.

3. The system of claim 2, wherein:
said screw conveyor is connected to a discharge line by an air lock means for allowing passage of said first material therethrough while preventing an internal pressure within said discharge line from being communicated to said screw conveyor.

4. The system of claim 3, further comprising:
a first flexible connecting means for connecting said first storage means to said metering bin means; and
a second flexible connecting means for connecting said screw conveyor to said air lock means.

5. The system of claim 4, wherein:
an area of an upward facing opening in said metering bin means communicated with said first storage means is equal to an area of a downward facing opening in said screw conveyor communicated with said air lock means.

6. The system of claim 5, further comprising:
vent means for communicating a discharge end of said conveyor means with an upper portion of said metering bin means, so that internal pressures within said metering bin means and said conveyor means are substantially equalized.

7. The system of claim 3, wherein:
said air lock is a blow-through air lock.

8. The system of claim 3, wherein:
said air lock is a drop-through air lock.

9. The system of claim 1, further comprising:
vent means for communicating a discharge end of said conveyor means with an upper portion of said metering bin means, so that internal pressures within said metering bin means and said conveyor means are substantially equalized.

10. The system of claim 1, wherein:
said metering bin is further characterized as being a mass flow bin.

11. The system of claim 10, wherein:
said first metering bin means has a chisel shaped cross section normal to a longitudinal axis of said first conveyor means, with two tapered walls sloped toward said conveyor means.

12. The system of claim 11, wherein:
said conveyor means includes a screw conveyor having a pitch which varies along its length so that a capacity of said screw conveyor increases toward a discharge end thereof.

13. A material storage and metering system, comprising:
first storage means for storing a first solid phase material;
first metering means for transferring said first material from said first storage means at a controlled flow rate within a first range of flow rates for blending with a flowing primary substance, said first range being defined with a low end and a high end;
second storage means, for storing a second solid phase material;
second metering means for transferring said second material from said second storage means at a controlled flow rate within a second range of flow rates for blending with said flowing primary substance, said second range being defined by a low end and a high end, said high end of said second range being at least substantially as great as said low end of said first range;
control station means, responsive to the flow rates of said first and second materials, and to a flow rate of said primary substance, for providing the controlled flow rates of said first and second materials, said control station means including:
material determining means for determining the amounts of said first material and said second material being discharged from said first storage means and said second storage means;
primary substance sensing means for sensing the amount of said primary substance being discharged from a primary substance container; and
controlling means, responsive to said material determining means and said primary substance sensing means, for controlling the amounts of said first and second materials being discharged from said first and second storage means;
a first flexible connecting means for connecting said first storage means to said first metering means; and
a second flexible connecting means for connecting said first metering means to a discharge conduit means.

14. The system of claim 13, wherein:
an area of a first opening in said first metering means communicated with said first flexible connecting means is equal to an area of an opposed second opening in said first metering means communicating with said second flexible connecting means, so that forces acting on said first metering means, due to internal pressures, are balanced.

15. The system of claim 14, wherein:
said second flexible connecting means includes a flexible bellows.

16. A material storage and metering system, comprising:
first storage means for storing a first solid phase material;
first metering means for transferring said first material from said first storage means at a controlled flow rate within a first range of flow rates for blending with a flowing primary substance, said first range being defined with a low end and a high end;
second storage means, for storing a second solid phase material;
second metering means for transferring said second material from said second storage means at a controlled flow rate within a second range of flow rates for blending with said flowing primary substance, said second range being defined by a low end and a high end, said high end of said second range being at least substantially as great as said low end of said first range;
control station means, responsive to the flow rates of said first and second materials, and to a flow rate of said primary substance, for providing the controlled flow rates of said first and second materials, said control station means including:
material determining means for determining the amounts of said first material and said second material being discharged from said first storage means and said second storage means;
primary substance sensing means for sensing the amount of said primary substance being discharged from a primary substance container; and
controlling means, responsive to said material determining means and said primary substance sensing means, for controlling the amounts of said first and second materials being discharged from said first and second storage means;
a discharge conduit means for receiving said first and second materials from said first and second metering means and conveying said first and second materials to a common discharge point for blending with said primary substance; and
blower means for supplying a pressurized gas to said discharge conduit means to carry said first and second materials through said discharge conduit means.

17. A material storage and metering system, comprising:
first storage means for storing a first solid phase material;
first metering means for transferring said first material from said first storage means at a controlled flow rate within a first range of flow rates for blending with a flowing primary substance, said first range being defined with a low end and a high end;
second storage means, for storing a second solid phase material;
second metering means for transferring said second material from said second storage means at a controlled flow rate within a second range of flow rates for blending with said flowing primary substance, said second range being defined by a low end and a high end, said high end of said second range being at least substantially as great as said low end of said first range;
control station means, responsive to the flow rates of said first and second materials, and to a flow rate of said primary substance, for providing the controlled flow rates of said first and second materials, said control station means including:

material determining means for determining the amounts of said first material and said second material being discharged from said first storage means and said second storage means;

primary substance sensing means for sensing the amount of said primary substance being discharged from a primary substance container; and controlling means, responsive to said material determining means and said primary substance sensing means, for controlling the amounts of said first and second materials being discharged from said first and second storage means; and aeration means disposed in said first storage means for fluidizing said first material to aid in the flow of said first material from said first storage means.

18. A material storage and metering system, comprising:

first storage means for storing a first solid phase material;

first metering means for transferring said first material from said first storage means at a controlled flow rate within a first range of flow rates for blending with a flowing primary substance, said first range being defined with a low end and a high end;

second storage means, for storing a second solid phase material;

second metering means for transferring said second material from said second storage means at a controlled flow rate within a second range of flow rates for blending with said flowing primary substance, said second range being defined by a low end and a high end, said high end of said second range being at least substantially as great as said low end of said first range; and control station means, responsive to the flow rates of said first and second materials, and to a flow rate of said primary substance, for providing the controlled flow rates of said first and second materials, said control station means including:

material determining means for determining the amounts of said first material and said second material being discharged from said first storage means and said second storage means;

primary substance sensing means for sensing the amount of said primary substance being discharged from a primary substance container; and controlling means, responsive to said material determining means and said primary substance sensing means, for controlling the amounts of said first and second materials being discharged from said first and second storage means;

wherein said first metering means includes:

a metering bin means for receiving said first material from said first storage means;

a hydraulically powered screw conveyor means, controlled by said controlling means, for discharging said first material from said metering bin means at said controlled rate within said first range of flow rates; and a hydraulically powered air lock means, controlled by said controlling means, connecting said screw conveyor to a discharge conduit, for allowing passage of said first material therethrough while preventing an internal pressure within said discharge conduit from being communicated to said screw conveyor means.

19. The system of claim 18, wherein:

a first hydraulic motor powering said screw conveyor means and a second hydraulic motor powering said air lock means are connected hydraulically in series to a hydraulic control valve controlled by said controlling means; and said first and second hydraulic motors, said screw conveyor means and said air lock means are so constructed that for a given rate of supply of hydraulic fluid under pressure to said first and second hydraulic motors from said hydraulic control valve a maximum flow rate of said first material which can be passed through said air lock mens exceeds a maximum flow rate of said first material which can be discharged by said screw conveyor means.

20. A material storage and metering system, comprising:

first storage means for storing a first solid phase material;

first metering means for transferring said first material from said first storage means at a controlled flow rate within a first range of flow rates for blending with a flowing primary substance, said first range being defined with a low end and a high end;

second storage means, for storing a second solid phase material;

second metering means for transferring said second material from said second storage means at a controlled flow rate within a second range of flow rates for blending with said flowing primary substance, said second range being defined by a low end and a high end, said high end of said second range being at least substantially as great as said low end of said first range;

control station means, responsive to the flow rates of said first and second materials, and to a flow rate of said primary substance, for providing the controlled flow rates of said first and second materials, said control station means including:

material determining means for determining the amounts of said first material and said second material being discharged from said first storage means and said second storage means;

primary substance sensing means for sensing the amount of said primary substance being discharged from a primary substance container; and controlling means, responsive to said material determining means and said primary substance sensing means, for controlling the amounts of said first and second materials being discharged from said first and second storage means; and a transportable frame having ground engaging means for allowing said frame to traverse a ground surface, said first and second storage means and said first and second metering means being mounted upon said frame for transport therewith.

21. The system of claim 20, wherein:

said first storage means is supported from said transportable frame by a first support means and a load cell support means.

22. The system of claim 21, wherein:

said material determining means includes means, associated with said load cell support means, for sensing a weight supported by said load cell means and for generating a signal representing said weight.

23. The system of claim 22, wherein:

said load cell support means includes a lift means movable between a first position wherein said load cell support means is held in load supporting engagement with said first storage means and a second position wherein said load cell support means is held out of load supporting engagement with said first storage means; and said load cell support means and said first metering means are connected to a common power source and are so arranged and constructed that when power is supplied from said source to said first metering means power is also supplied to said lift means to move said lift means to its said first position, and when power is disconnected from said first metering means power is also disconnected from said lift means so that said lift means returns to its said second position.

24. The system of claim 23, wherein:

said common power source is a hydraulic power source; and said lift means includes a hydraulic cylinder arranged to extend upon supply of hydraulic power thereto.

25. The system of claim 24, wherein:

said first support means is further characterized as being a support means for providing at least one degree of freedom of movement of said first storage means relative to said transportable frame.

26. The system of claim 25, wherein:

said first support means includes a ball and socket supporting joint.

27. The system of claim 21, wherein:

said first support means is further characterized as being a support means for providing at least one degree of freedom of movement of said first storage means relative to said transportable frame.

28. The system of claim 27, wherein:

said first support means includes a ball and socket supporting joint.

29. The system of claim 20, wherein said first metering system includes:

a metering bin means for receiving said first material from said first storage means;

a conveyor means, controlled by said controlling means, for discharging said first material from said metering bin means at a controlled rate within said first range of flow rates; and wherein said metering bin means is supported from said transportable frame by a first support means and a load cell support means.

30. The system of claim 29, wherein:

said material determining means includes means, associated with said load cell support means, for sensing a weight supported by said load cell means and for generating a signal representing said weight.

31. The system of claim 30, wherein:

said load cell support means includes a lift means movable between a first position wherein said load cell support means is held in load supporting engagement with said metering bin means and a second position wherein said load cell support means is held out of load supporting engagement with said metering bin means; and said load cell support means and said conveyor means are connected to a common power source and are so arranged and constructed that when power is supplied from said source to said conveyor means power is also supplied to said lift means to move said lift means to its said first position, and when power is disconnected from said conveyor means power is also disconnected from said lift means so that said lift means returns to its said second position.

32. The system of claim 31, wherein:

said common power source is a hydraulic power source; and said lift means includes a hydraulic cylinder arranged to extend upon supply of hydraulic power thereto.

33. The system of claim 31, wherein:

said first support means is further characterized as being a support means for providing at least one degree of freedom of movement of said first metering bin means relative to said transportable frame.

34. The system of claim 33, wherein:

said first support means includes a ball and socket supporting joint.

35. The system of claim 29, wherein:

said first support means is further characterized as being a support means for providing at least one degree of freedom of movement of said first metering bin means relative to said transportable frame.

36. The system of claim 35, wherein:

the first support means includes a ball and socket supporting joint.

37. A material storage and metering system, comprising:

first storage means for storing a first material;

first metering means for transferring said first material from said first storage means at a controlled flow rate within a first range of flow rates for blending with a flowing primary substance, said first range being defined with a low end and a high end;

second storage means, for storing a second material;

second metering means for transferring said second material from said second storage means at a controlled flow rate within a second range of flow rates for blending with said flowing primary substance, said second range being defined by a low end and a high end, said high end of said second range being at least substantially as great as said low end of said first range; and control station means, responsive to the flow rates of said first and second materials, and to a flow rate of said primary substance, for providing the controlled flow rates of said first and second material, said control station means including:

material determining means for determining the amounts of said first material and said second material being discharged from said first storage means and said second storage means, said material determining means including means for detecting the weight of a first portion of said first material and for generating a first electrical signal proportional to the detected weight;

primary substance sensing means for sensing the amount of said primary substance being discharged from a primary substance container; and controlling means, responsive to said material determining means and said primary substance sensing means, for controlling the amounts of said first and second materials being discharged from said first and second storage means.

38. The system as defined in claim 37 wherein said material determining means further includes means for filtering the first electrical signal.

39. The system as defined in claim 38 wherein said material determining means further includes:
 means for converting the filtered first electrical signal into a digitally-coded format; and
 means for retaining the digitally-coded signal for acquisition by said controlling means.

40. An apparatus as recited in claim 39, wherein said controlling means includes:
 means for calculating a required amount of said first material to be discharged from said first storage means;
 means for retrieving the digitally-coded signal retained by said retaining means at a first time and for retrieving the digitally-coded signal retained by said retaining means at a second time;
 means, responsive to said retrieving means, for computing the amount of said first material discharged from said first storage means between said first time and said second time;
 means for subtracting the amount of said first material discharged from said first storage means from the calculated required amount to be discharged; and
 means, responsive to said subtracting means, for correcting the amount of said first material discharged from said first storage means.

41. The system as defined in claim 37 wherein said material determining means further includes means for sensing the weight of a second portion of said first material and for generating a second electrical signal proportional to the sensed weight.

42. The system as defined in claim 41 wherein said material determining means further includes means for filtering the first electrical signal.

43. The system as defined in claim 42 wherein said material determining means further includes:
 means for converting the filtered first electrical signal into a digitally-coded format; and
 means for retaining the digitally-coded signal for acquisition by said controlling means.

44. A material storage and metering system, comprising:
 first storage means for storing a first material;
 first metering means for transferring said first material from said first storage means at a controlled flow rate within a first range of flow rates for blending with a flowing primary substance, said first range being defined with a low end and a high end;
 second storage means, for storing a second material;
 second metering means for transferring said second material from said second storage means at a controlled flow rate within a second range of flow rates for blending with said flowing primary substance, said second range being defined by a low end and a high end, said high end of said second range being at least substantially as great as said low end of said first range; and
 control station means, responsive to the flow rates of said first and second materials, and to a flow rate of said primary substance, for providing the controlled flow rates of said first and second materials, said control station means including:
 material determining means for determining the amounts of said material and said second material being discharged from said first storage means and said second storage means;
 primary substance sensing means for sensing the amount of said primary substance being discharged from a primary substance container; and
 controlling means, responsive to said material determining means and said primary substance sensing means, for controlling the amounts of said first and second materials being discharged from said first and second storage means;
 wherein said material determining means includes:
 means for monitoring the volumetric flow rate of said first material and for generating an electrical signal proportional to the monitored flow rate;
 means for converting the electrical signal into a digitally-coded format; and
 means for retaining the digitally-coded signal for acquisition by said controlling means.

45. An apparatus as recited in claim 44, wherein said controlling means includes:
 means for calculating a required amount of said first material to be discharged from said first storage means;
 means for retrieving and scaling the digitally-coded signal retained in said retaining means;
 means for subtracting the scaled, digitally-coded signal from the required amount of said first material to be discharged; and
 means, responsive to said subtracting means, for correcting the amount of said first material discharged from said first storage means.

46. A material storage and metering system, comprising:
 first storage means for storing a first material;
 first metering means for transferring said first material from said first storage means at a controlled flow rate within a first range of flow rates for blending with a flowing primary substance, said first range being defined with a low end and a high end;
 second storage means, for storing a second material;
 second metering means for transferring said second material from said second storage means at a controlled flow rate within a second range of flow rates for blending with said flowing primary substance, said second range being defined by a low end and a high end, said high end of said second range being at least substantially as great as said low end of said first range; and
 control station means, responsive to the flow rates of said first and second materials, and to a flow rate of said primary substance, for providing the controlled flow rates of said first and second materials, said control station means including:
 material determining means for determining the amounts of said first material and said second material being discharged from said first storage means and said second storage means;
 primary substance sensing means for sensing the amount of said primary substance being discharged from a primary substance container; and
 controlling means, responsive to said material determining means and said primary substance sensing means, for controlling the amounts of said first and second materials being discharged from said first and second storage means;
 wherein said primary substance sensing means includes:

means for generating a first electrical signal proportional to the flow rate of the sensed primary substance;

means for simulating a flow rate of the primary substance and for generating a second electrical signal proportional to the simulated flow rate; and means for switchably communicating said first electrical signal generating means and said simulating and generating means with said controlling means.

47. The system as defined in claim 46 wherein said material determining means includes means for monitoring the volumetric flow rate of said first material and for generating a third electrical signal proportional to the monitored flow rate.

48. The system as defined in claim 46 wherein said material determining means includes means for detecting the weight of a first portion of said first material and for generating a third electrical signal proportional to the detected weight.

49. The system as defined in claim 48 wherein said material determining means further includes means for filtering the third electrical signal.

50. The system as defined in claim 49 wherein said material determining means further includes means for sensing the weight of a second portion of said first material and for generating a fourth electrical signal proportional to the sensed weight.

51. A material storage and metering system, comprising:

first storage means for storing a first material;

first metering means for transferring said first material from said first storage means at a controlled flow rate within a first range of flow rates for blending with a flowing primary substance, said first range being defined with a low end and a high end;

second storage means, for storing a second material;

second metering means for transferring said second material from said second storage means at a controlled flow rate within a second range of flow rates for blending with said flowing primary substance, said second range being defined by a low end and a high end, said high end of said second range being at least substantially as great as said low end of said first range; and control station means, responsive to the flow rates of said first and second materials, and to a flow rate of said primary substance, for providing the controlled flow rates of said first and second materials, said control station means including:

material determining means for determining the amounts of said first material and said second material being discharged from said first storage means and said second storage means;

primary substance sensing means for sensing the amount of said primary substance being discharged from a primary substance container; and controlling means, responsive to said material determining means and said primary substance sensing means, for controlling the amounts of said first and second materials being discharged from said first and second storage means;

wherein said controlling means includes:

means for comparing the amount of discharged first material with a predetermined reference value; and means, responsive to said comparing means, for creating an error signal when the discharged amounts do not favorably compare with the predetermined reference value.

52. The system as defined in claim 51 wherein said controlling means further includes:

means for varying the predetermined reference value; and means for displaying the error signal in a perceptible format.

53. The system as defined in claim 51 wherein said controlling means further includes means for using the error signal to provide a correction signal so that the amount of said first material discharged from said first storage means is thereby controlled.

54. A controlled additive metering system, comprising:

a frame;

a plurality of solid phase additive containers located on said frame, each of said solid phase additive containers having a solid phase additive stored therein;

a plurality of liquid additive containers loaded on said frame, each of said liquid additive containers having a liquid additive stored therein;

a primary substance container having a primary substance stored therein, which primary substance is for mixing with the solid phase and liquid additives;

means for discharging each solid phase additive from each of said solid phase additive containers;

means for discharging each liquid additive from each of said liquid additive containers;

means for discharging the primary substance from said primary substance container;

means for determining the amount of solid phase additive being discharged from each of said solid phase additive containers;

means for determining the amount of liquid additive being discharged from each of the liquid additive containers;

means for sensing the amount of primary substance being discharged from the primary substance container; and means, responsive to said solid phase additive determining means, said liquid additive determining means, and said primary substance sensing means, for controlling said solid phase additive and liquid additive discharge means so that the quantity of the solid phase and liquid additives mixed with the primary substance is thereby metered.

55. The system as defined in claim 54 wherein said controlling means includes an integrated circuit microprocessor-based circuit having a data bus and an address bus connected to respective ports of a plurality of integrated circuit latch means, each of which latch means is associated with a respective one of said solid phase additive discharging means, said liquid additive discharging means, said solid phase additive determining means, said liquid additive determining means and said primary substance sensing means so that all communications from one element to another are controlled by said microprocessor.

* * * * *